(12) United States Patent
Raburn et al.

(10) Patent No.: US 9,916,662 B2
(45) Date of Patent: Mar. 13, 2018

(54) FOREGROUND DETECTION USING FRACTAL DIMENSIONAL MEASURES

(71) Applicant: Lyrical Labs Video Compression Technology, LLC, New York, NY (US)

(72) Inventors: Daniel Louis Raburn, Chicago, IL (US); Edward Ratner, Iowa City, IA (US)

(73) Assignee: Lyrical Labs Video Compression Technology, LLC, New York, NY (US)

( * ) Notice: Subject to any disclaimer, the term of this patent is extended or adjusted under 35 U.S.C. 154(b) by 0 days.

(21) Appl. No.: 14/737,418

(22) Filed: Jun. 11, 2015

(65) Prior Publication Data

US 2016/0275692 A1    Sep. 22, 2016

Related U.S. Application Data

(60) Provisional application No. 62/134,534, filed on Mar. 17, 2015.

(51) Int. Cl.
| | |
|---|---|
| *G06K 9/34* | (2006.01) |
| *G06T 7/00* | (2017.01) |
| *G06K 9/62* | (2006.01) |
| *G06T 7/11* | (2017.01) |

(Continued)

(52) U.S. Cl.
CPC .......... *G06T 7/0081* (2013.01); *G06K 9/6267* (2013.01); *G06T 7/11* (2017.01); *G06T 7/174* (2017.01); *G06T 7/194* (2017.01); *G06T 2207/10016* (2013.01)

(58) Field of Classification Search
USPC ..... 382/173, 180, 181, 232, 257; 358/426.1; 375/E7.081
See application file for complete search history.

(56) References Cited

U.S. PATENT DOCUMENTS 5,854,857 A * 12/1998 de Queiroz ........ H04N 1/40062
358/426.1
6,175,655 B1 * 1/2001 George, III ......... G06F 19/3437
358/451

(Continued)

FOREIGN PATENT DOCUMENTS

| CN | 102411776 A | | 4/2012 | |
|---|---|---|---|---|
| EP | 2463821 | * | 6/2012 | ............... G06T 7/00 |
| EP | 2463821 A1 | | 6/2012 | |

OTHER PUBLICATIONS

International Search Report and Written Opinion issued in PCT/US2016/022941, mailed Jul. 5, 2016, 12 pages.

*Primary Examiner* — Anh Do
(74) *Attorney, Agent, or Firm* — Faegre Baker Daniels LLP

(57) ABSTRACT

A technique for foreground determination includes analyzing pixels that are deemed to be changing between frames, and applying a filtration technique that is based on fractal methods. Implementations include applying a filter that is designed to eliminate structures of dimensionality less than unity while preserving those of dimensionality unity and greater. The technique may be performed in real-time and makes use of a variable threshold for foreground determination and image segmentation techniques.

25 Claims, 36 Drawing Sheets
(20 of 36 Drawing Sheet(s) Filed in Color)

(51) Int. Cl.
*G06T 7/174* (2017.01)
*G06T 7/194* (2017.01)

(56) References Cited

U.S. PATENT DOCUMENTS

| | | |
|---|---|---|
| 7,742,650 B2 * | 6/2010 | Xu .................... G06K 9/344 382/173 |
| 2004/0161161 A1 | 8/2004 | Recht |
| 2010/0184093 A1 | 7/2010 | Donovan et al. |
| 2014/0184739 A1 | 7/2014 | Kuo |

* cited by examiner

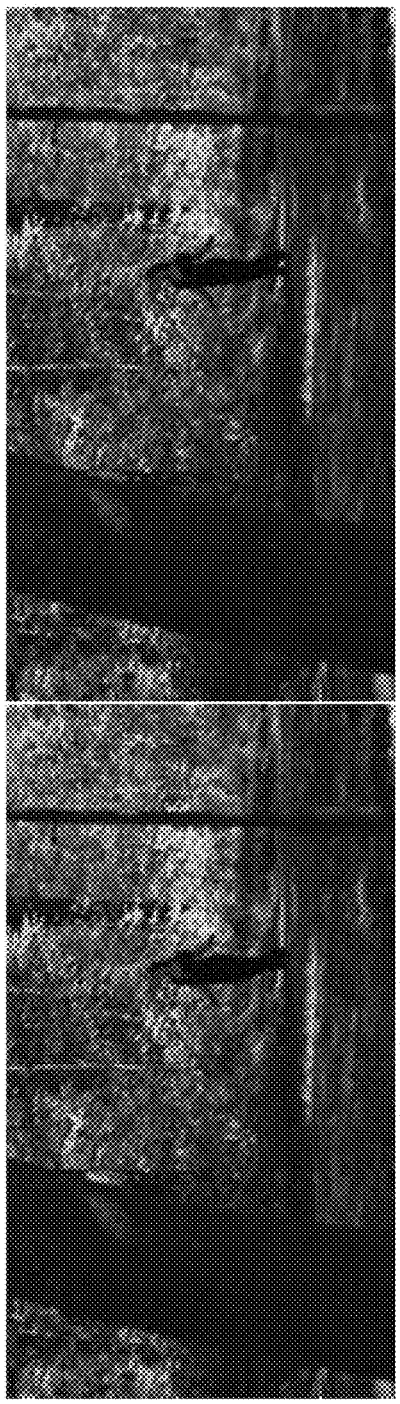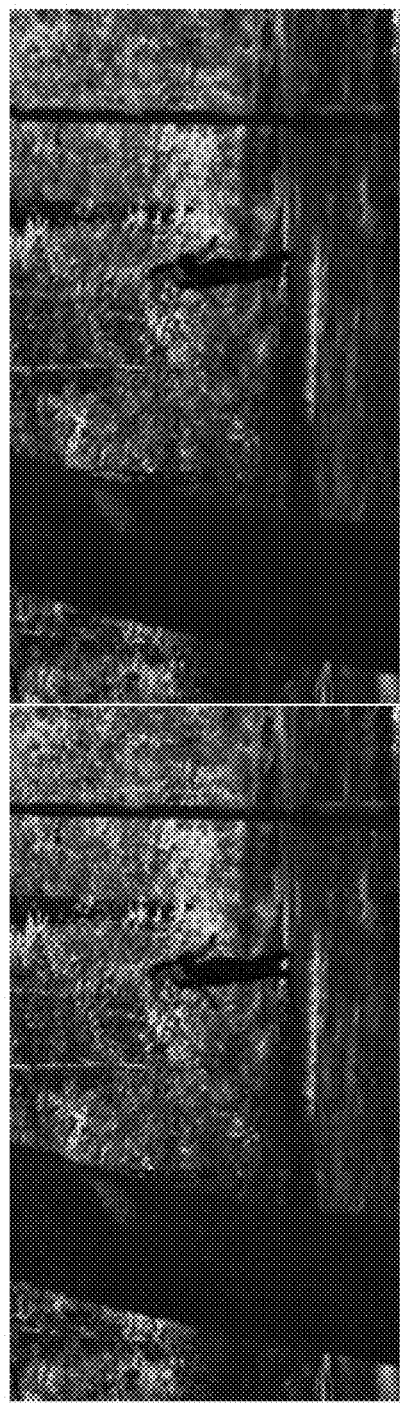
FIG. 9A  FIG. 9B  FIG. 9C  FIG. 9D

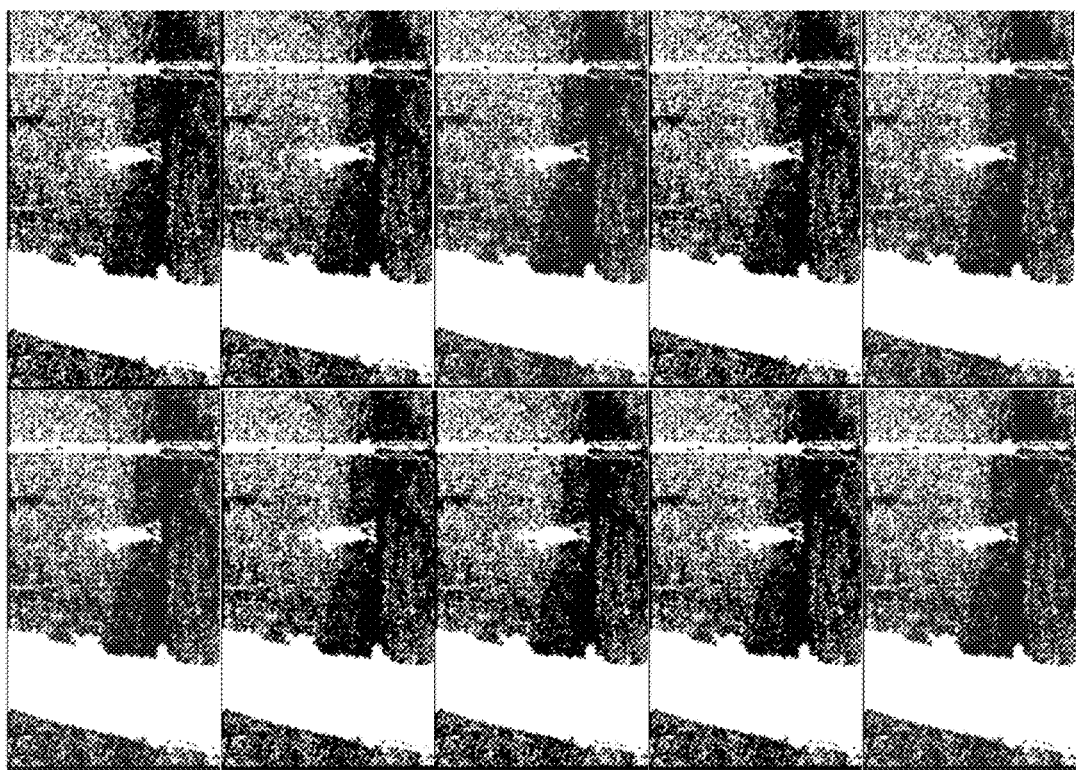

FOREGROUND DETECTION USING FRACTAL DIMENSIONAL MEASURES

CROSS-REFERENCE TO RELATED APPLICATION

This application claims priority to Provisional Application No. 62/134,534, filed on Mar. 17, 2015, the entirety of which is hereby incorporated by reference for all purposes.

BACKGROUND

Foreground detection provides both a means of efficient allocation of computational resources and a method for reducing false-positives when determining which parts of a video sequence are "important" for some desired purpose. Many traditional methods of foreground detection consider the changes in pixel values between frames. Some methods of filtration—such as a median filter—are often used, and are described, for example, in P-M. Jodoin, S. Piérard, Y. Wang, and M. Van Droogenbroeck, "Overview and Benchmarking of Motion Detection Methods," *Background Modeling and Foreground Detection for Video Surveillance*, Chapter 1, which is hereby incorporated by reference in its entirety for all purposes. A more recently developed approach is the use of a fractal measure applied to a portion of a video frame, with a fractal dimensionality of the joint histogram suggesting a contextual change, distinct from a local lighting change; here, the dimensionality is measured using a box-counting method, as described by Farmer in M. E. Farmer, "A Chaos Theoretic Analysis of Motion and Illumination in Video Sequences", *Journal of Multimedia*, Vol. 2, No. 2, 2007, pp. 53-64; and M. E. Farmer, "Robust Pre-Attentive Attention Direction Using Chaos Theory for Video Surveillance", *Applied Mathematics*, 4, 2013, pp. 43-55, each of which is hereby incorporated by reference in its entirety for all purposes. Searching for explicitly self-similar structures in image physical space has also been used with success to find important parts of an image, as described in H. Li, K. J. R. Lui, and S-C. B. Lo, "Fractal Modeling and Segmentation in the Enhancement of Microcalcifications in Digital Mammograms", *Report by Institute for Systems Research*, University of Maryland, College Park, Md., 20742, 1997, which is hereby incorporated by reference in its entirety for all purposes.

SUMMARY

Embodiments facilitate a technique for foreground detection that includes analyzing pixels that are deemed to be changing between frames, and applying a filtration technique that is based on fractal analysis methods. Implementations include applying a filter that is designed to eliminate structures of dimensionality less than unity while preserving those of dimensionality unity and greater. Embodiments of the technique may be performed in real-time and make use of a variable threshold for foreground detection and image segmentation techniques.

In an Example 1, a method of foreground detection comprises: receiving a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image; receiving a segment map corresponding to the current image, the segment map defining at least one segment of the current image; constructing a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification corresponding to a foreground or a background; constructing a filtered foreground indicator map by filtering the foreground indicator map by applying a filter configured to preserve structures having a fractal dimensionality of at least one; and identifying, based on the filtered foreground indicator map, the at least one segment as a foreground segment or a background segment.

In an Example 2, the method of Example 1, wherein constructing the foreground indicator map comprises: constructing an ambient background image; and constructing a difference image, the difference image comprising a set of pixels, wherein each pixel of the difference image indicates a difference between a corresponding pixel in the ambient background image and a corresponding pixel in the current image.

In an Example 3, the method of Example 2, wherein the ambient background image comprises a median background image, the median background image comprising a set of pixels, each of the set of pixels of the median background image having a plurality of color components, wherein each color component of each pixel of the median background image comprises the median of a corresponding component of corresponding pixels in the current image, the first previous image, and the second previous image.

In an Example 4, the method of any of Examples 1-3, wherein the foreground indicator map is a binary foreground indicator map (BFIM).

In an Example 5, the method of Example 4, wherein constructing the BFIM comprises: determining, for each of the set of pixels in the BFIM, whether a corresponding pixel in the difference image corresponds to a difference that exceeds a threshold, wherein the threshold is indicated by a corresponding pixel in the threshold image, the threshold image comprising a set of pixels, wherein each pixel of the threshold image indicates an amount by which a pixel can change between images and still be considered part of the background; and assigning an initial classification to each of the set of pixels in the BFIM, wherein the initial classification of a pixel is foreground if the corresponding difference exceeds the threshold.

In an Example 6, the method of Example 5, wherein filtering the BFIM comprises: constructing a neighbor sum map, the neighbor sum map comprising, for a first pixel of the set of pixels in the BFIM, a first neighbor sum map value and a second neighbor sum map value, wherein the first pixel includes an initial classification as foreground; applying, for the first pixel, a set of filter criteria to the first and second neighbor sum map values; and retaining the initial classification of foreground for the first pixel if the filter criteria are satisfied.

In an Example 7, the method of Example 6, wherein constructing the neighbor sum map comprises: identifying, for the first pixel, a first box having a first box half size, s1, centered at the first pixel; determining the first neighbor sum map value, the first neighbor sum map value comprising a number of pixels contained within the first box that have an initial classification as foreground; identifying, for the first pixel, a second box having a second box half size, s2, centered at the first pixel; and determining the second neighbor sum map value, the second neighbor sum map value comprising a number of pixels contained within the second box that have an initial classification as foreground.

In an Example 8, the method of Example 7, wherein s1 is less than s2, and wherein retaining the initial classification of foreground for the first pixel if the filter criteria are satisfied comprises retaining the first pixel if all of the following are true: the first neighbor sum map value is greater than or equal to the greatest integer that is not greater than the product of s1 and a first constant; the second neighbor sum map value is greater than or equal to the greatest integer that is not greater than the product of s2 and the first constant; and the second neighbor sum map value is greater than or equal to the sum of the first neighbor sum map value and the greatest integer that is not greater than the product of a second constant and the difference between s2 and s1.

In an Example 9, the method of Example 8, wherein the first constant is 0.9 and the second constant is 0.4.

In an Example 10, the method of any of Examples 4-9, wherein identifying the at least one segment as a foreground segment or a background segment comprises: determining, based on the filtered BFIM, at least one foreground metric corresponding to the at least one segment; determining, based on the at least one foreground metric, at least one variable threshold; and applying the at least one variable threshold to the filtered BFIM to identify the at least one segment as a foreground segment or a background segment.

In an Example 11, the method of Example 10, wherein determining the at least one foreground metric comprises: determining an un-weighted foreground area fraction (UFAF) by dividing the number of foreground pixels in the at least one segment by the total number of pixels in the at least one segment; determining a foreground perimeter fraction (FPF) by dividing the number of foreground pixels on the perimeter of the at least one segment by the total number of pixels on the perimeter of the at least one segment; and determining a weighted foreground area fraction (WFAF) by applying a variable weight to each of the pixels in the at least one segment and dividing the weighted number of foreground pixels in the at least one segment by the weighted total number of pixels in the segment.

In an Example 12, the method of Example 11, wherein determining, based on the at least one foreground metric, the at least one variable threshold comprises: constructing, based on the UFAF, a first foreground curve; constructing, based on the FPF, a second foreground curve; constructing, based on the WFAF, a third foreground curve; determining a first variable threshold by determining an intersection between the first foreground curve and a first monotonically decreasing threshold curve; determining a second variable threshold by determining an intersection between the second foreground curve and a second monotonically decreasing threshold curve; and determining a third variable threshold by determining an intersection between the third foreground curve and a third monotonically decreasing threshold curve; wherein if the at least one segment is above the first variable threshold, the second variable threshold or the third variable threshold, the at least one segment is identified as foreground.

In an Example 13, the method of any of Examples 1-3, wherein the foreground indicator map is a non-binary foreground indicator map (NBFIM).

In an Example 14, the method of Example 13, wherein constructing the NBFIM comprises: constructing a normalized absolute difference image (NADI), wherein the NADI comprises a set of pixels, each of the set of pixels comprising a plurality of components, wherein each component of each pixel of the NADI is equal to a corresponding value in the difference image divided by a corresponding value in the foreground threshold image; constructing an unfiltered NBFIM, having a set of pixels, wherein each pixel of the NBFIM is equal to the arc-hyperbolic sine of the sum of the squares of the components of a corresponding pixel in the NADI with a coefficient of 0.5 for each of the chroma components; and applying a non-binary fractal-based analysis to generate a filtered NBFIM.

In an Example 15, the method of Example 14, wherein filtering the NBFIM comprises: constructing a neighbor sum map, the neighbor sum map comprising, for each of the pixels of the NBFIM, a first neighbor sum map value and a second neighbor sum map value; and applying, for each of the pixels of the NBFIM, a set of filter criteria to the first and second neighbor sum map values.

In an Example 16, the method of Example 15, wherein constructing the neighbor sum map comprises: identifying, for each of the pixels of the NBFIM, a first box having a first box half size, s1, centered at the pixel; determining the first neighbor sum map value, the first neighbor sum map value comprising a sum of the values of the NBFIM pixels contained within the first box; identifying, for each of the pixels of the NBFIM, a second box having a second box half size, s2, centered at the pixel; and determining the second neighbor sum map value, the second neighbor sum map value comprising a sum of the values of the NBFIM pixels contained within the second box.

In an Example 17, the method of Example 16, wherein s1 is less than s2, and wherein retaining each of the pixels of the NBFIM for which the filter criteria are satisfied comprises retaining each of the pixels of the NBFIM for which all of the following are true: the second neighbor sum map value corresponding to the pixel is greater than or equal to the product of a variable coefficient and s2; and the second neighbor sum map value corresponding to the pixel is greater than or equal to the sum of the first neighbor sum map value and the product of a second variable coefficient and the difference between s2 and s1.

In an Example 18, the method of Example 17, wherein the first variable coefficient comprises three times the mean value of the NBFIM at that iteration, and wherein the second variable coefficient comprises ten times the mean value of the NBFIM at that iteration.

In an Example 19, the method of Example 18, wherein identifying the at least one segment as a foreground segment or a background segment comprises: determining, based on the filtered NBFIM, at least one foreground metric corresponding to the at least one segment; determining, based on the at least one foreground metric, at least one variable threshold; and applying the at least one variable threshold to the filtered NBFIM to identify the at least one segment as a foreground segment or a background segment.

In an Example 20, the method of Example 19, wherein determining the at least one foreground metric comprises calculating the sum of the filtered NBFIM over each segment divided by the area of the segment.

In an Example 21, the method of any of Examples 13-20, further comprising applying an edge-enhancing technique to the filtered NBFIM to facilitate identification of at least one edge of a moving object.

In an Example 22, one or more computer-readable media has computer-executable instructions embodied thereon for foreground detection in a digital image, the instructions configured to cause a processor, upon execution, to instantiate at least one component, the at least one component comprising: a foreground detector, the foreground detector configured to: receive a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image; receive a segment map corresponding to the current image, the segment map defining at least one segment of the current image; construct a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification as foreground or background; construct a filtered foreground indicator map by filtering the foreground indicator map by applying a filter configured to preserve structures having a fractal dimensionality of at least one; and identify, based on the filtered foreground indicator map, the at least one segment as a foreground segment or a background segment.

In an Example 23, the media of Example 22, wherein the foreground indicator map is a non-binary foreground indicator map (NBFIM).

In an Example 24, a system for performing foreground detection comprises: an encoding device having a processor configured to instantiate at least one component stored in a memory, the at least one component comprising a foreground detector configured to: receive a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image; receive a segment map corresponding to the current image, the segment map defining at least one segment of the current image; construct a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification as foreground or background; construct a filtered foreground indicator map by filtering the foreground indicator map by applying a filter configured to preserve structures having a fractal dimensionality of at least one; and identify, based on the filtered foreground indicator map, the at least one segment as a foreground segment or a background segment.

In an Example 25, the system of Example 24, wherein the foreground indicator map is a non-binary foreground indicator map (NBFIM).

In an Example 26, a method of foreground detection comprises: receiving a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image; constructing a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification corresponding to a foreground or a background; constructing a filtered foreground indicator map by filtering the foreground indicator map by applying a filter configured to preserve structures having a fractal dimensionality of at least one; and identifying, based on the filtered foreground indicator map, each of the set of pixels as a foreground pixel or a background pixel.

In an Example 27, the method of Example 26, wherein the foreground indicator map is a non-binary foreground indicator map (NBFIM).

In an Example 28, one or more computer-readable media has computer-executable instructions embodied thereon for foreground detection in a digital image, the instructions configured to cause a processor, upon execution, to instantiate at least one component, the at least one component comprising: a foreground detector, the foreground detector configured to: receive a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image; construct a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification as foreground or background; construct a filtered foreground indicator map by filtering the foreground indicator map by applying a filter configured to preserve structures having a fractal dimensionality of at least one; and identify, based on the filtered foreground indicator map, each of the set of pixels as a foreground pixel or a background pixel.

In an Example 29, the media of Example 28, wherein the foreground indicator map is a non-binary foreground indicator map (NBFIM).

In an Example 30, a system for performing foreground detection comprises: an encoding device having a processor configured to instantiate at least one component stored in a memory, the at least one component comprising a foreground detector configured to: receive a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image; construct a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification as foreground or background; construct a filtered foreground indicator map by filtering the foreground indicator map by applying a filter configured to preserve structures having a fractal dimensionality of at least one; and identify, based on the filtered foreground indicator map, each of the set of pixels as a foreground pixel or a background pixel.

In an Example 31, the system of Example 30, wherein the foreground indicator map is a non-binary foreground indicator map (NBFIM).

BRIEF DESCRIPTION OF THE DRAWINGS

The patent or application file contains at least one drawing executed in color. Copies of this patent or patent application publication with color drawings will be provided by the Office upon request and payment of the necessary fee.

Figure 1:
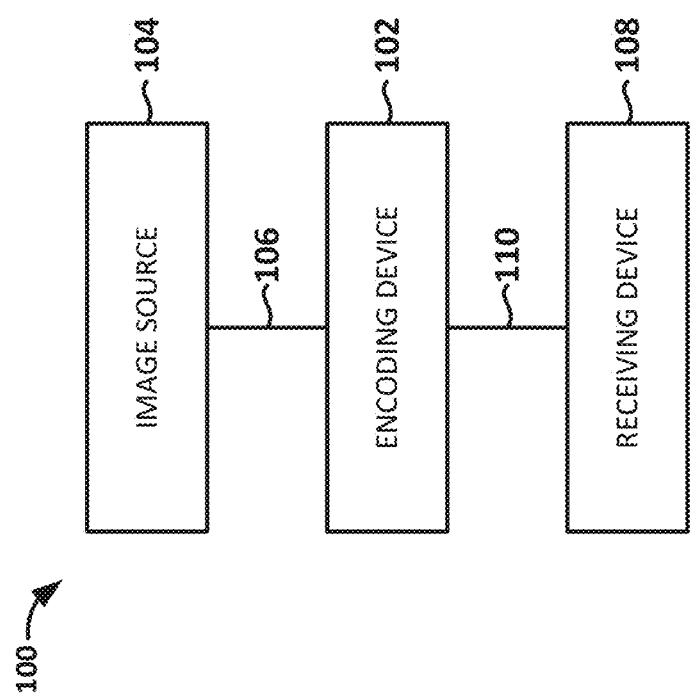
FIG. 1 is a block diagram depicting an illustrative image system, in accordance with embodiments of the present invention.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" may be used herein to connote different elements illustratively employed, the term should not be interpreted as implying any requirement of, or particular order among or between, various steps disclosed herein unless and except when explicitly referring to the order of individual steps.

DETAILED DESCRIPTION

Embodiments of the invention include systems and methods for foreground detection that facilitate identifying pixels that indicate a substantive change in visual content between frames, and applying a filtration technique that is based on fractal-dimension methods. For example, a filter may be applied that is configured to eliminate structures of dimensionality less than unity, while preserving those of dimensionality of unity or greater. Embodiments of techniques described herein may enable foreground detection to be performed in real-time (or near real-time) with modest computational burdens. Embodiments of the invention also may utilize variable thresholds for foreground detection and image segmentation techniques. As the term is used herein, "foreground detection" (also referred to, interchangeably, as "foreground determination") refers to the detection (e.g., identification, classification, etc.) of pixels that are part of a foreground of a digital image (e.g., a picture, a video frame, etc.).

FIG. 1 depicts an illustrative image system 100 having an encoding device 102. The encoding device 102 is illustratively coupled to an image source 104 by a communication link 106. In embodiments, the encoding device 102 illustratively receives an image file from the image source 104 over the communication link 106. Exemplary image files include, but are not limited to, digital photographs, digital image files from medical imaging, machine vision image files, video image files, and any other suitable images having a plurality of pixels. Encoding device 102 is illustratively coupled to a receiving device 108 by a communication link 110. In embodiments, the encoding device 102 communicates an image file over the communication link 110. In some embodiments, communication links 106 and/or 110 independently are, include, or are included in a wired network, a wireless network, or a combination of wired and wireless networks. In embodiments, one or both of communication links 106 and 110 are a network. Illustrative networks include any number of different types of communication networks such as, a short messaging service (SMS), a local area network (LAN), a wireless LAN (WLAN), a wide area network (WAN), the Internet, a P2P network, or other suitable networks. The network may include a combination of multiple networks.

Although not illustrated herein, the receiving device 108 may include any combination of components described herein with reference to the encoding device 102, components not shown or described, and/or combinations of these. In embodiments, the encoding device 102 may include, or be similar to, the encoding computing systems described in U.S. application Ser. No. 13/428,707, filed Mar. 23, 2012, entitled "VIDEO ENCODING SYSTEM AND METHOD;" and/or U.S. application Ser. No. 13/868,749, filed Apr. 23, 2013, entitled "MACROBLOCK PARTITIONING AND MOTION ESTIMATION USING OBJECT ANALYSIS FOR VIDEO COMPRESSION;" the disclosure of each of which is expressly incorporated by reference herein.

Figure 2:
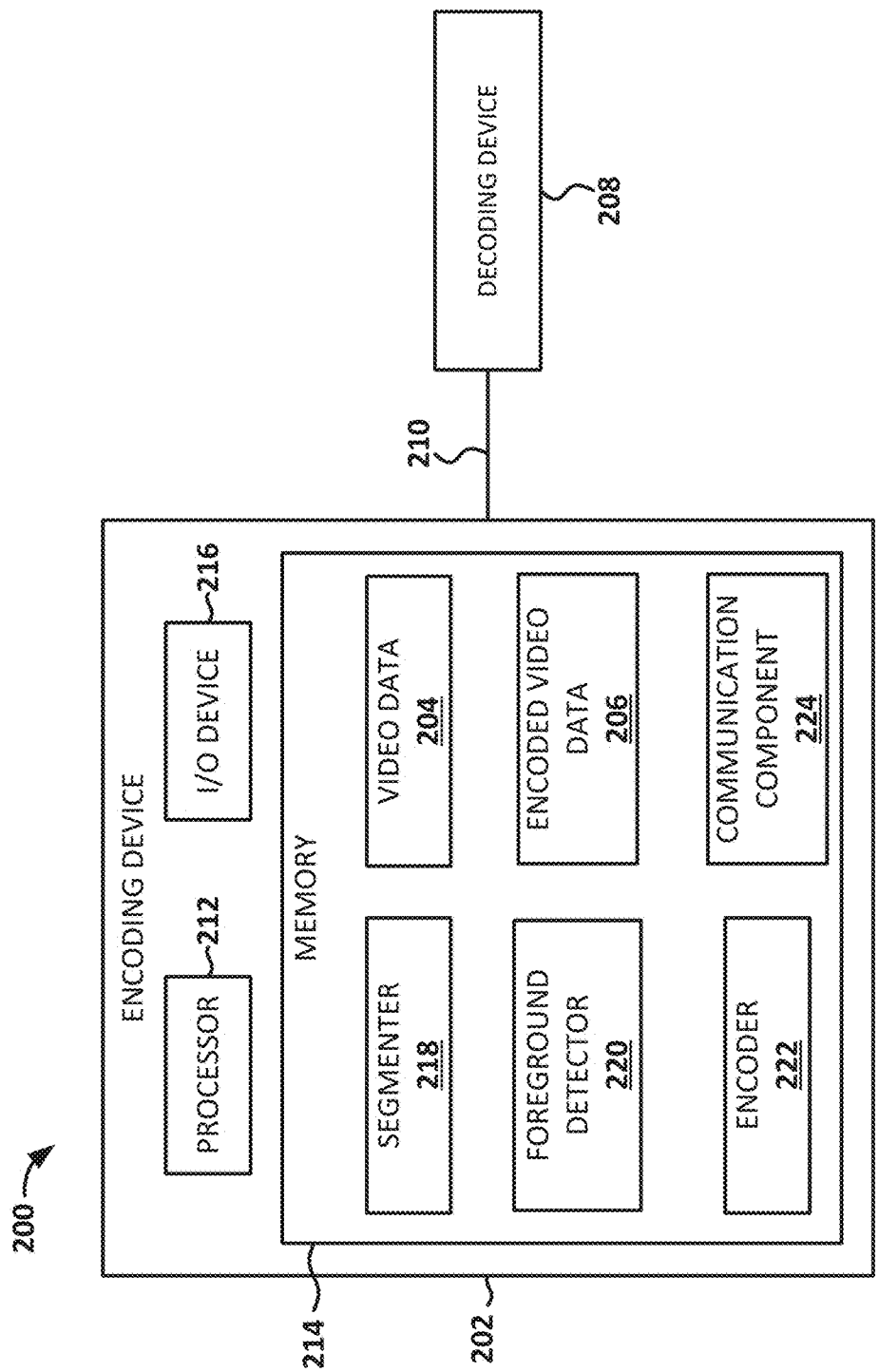
FIG. 2 is a block diagram illustrating an operating environment (and, in some embodiments, aspects of the present invention), in accordance with embodiments of the present invention.

FIG. 2 is a block diagram illustrating an operating environment 200 (and, in some embodiments, aspects of the present invention) in accordance with embodiments of the present invention. The operating environment 200 includes an encoding device 202 that may be configured to encode video data 204 to create encoded video data 206. As shown in FIG. 2, the encoding device 202 may also be configured to communicate the encoded video data 206 to a decoding device 208 via a communication link 210. In embodiments, the communication link 210 may be, include, and/or be included in, a network. The network may be, or include, any number of different types of communication networks such as, for example, a short messaging service (SMS), a local area network (LAN), a wireless LAN (WLAN), a wide area network (WAN), the Internet, a P2P network, and/or the like. The network may include a combination of multiple networks.

As shown in FIG. 2, the encoding device 202 may be implemented on a computing device that includes a processor 212, a memory 214, and an input/output (I/O) device 216. Although the encoding device 202 is referred to herein in the singular, the encoding device 202 may be implemented in multiple instances, distributed across multiple computing devices, instantiated within multiple virtual machines, and/or the like. In embodiments, the processor 212 executes various program components stored in the memory 214, which may facilitate encoding the video data 206. In embodiments, the processor 212 may be, or include, one processor or multiple processors. In embodiments, the I/O device 216 may be, or include, any number of different types of devices such as, for example, a monitor, a keyboard, a printer, a disk drive, a universal serial bus (USB) port, a speaker, pointer device, a trackball, a button, a switch, a touch screen, and/or the like.

According to embodiments, as indicated above, various components of the operating environment 200, illustrated in FIG. 2, may be implemented on one or more computing devices. A computing device may include any type of computing device suitable for implementing embodiments of the invention. Examples of computing devices include specialized computing devices or general-purpose computing devices such as "workstations," "servers," "laptops," "desktops," "tablet computers," "hand-held devices," and the like, all of which are contemplated within the scope of FIG. 1 with reference to various components of the operating environment 200. For example, according to embodiments, the encoding device 202 (and/or the video decoding device 208) may be, or include, a general purpose computing device (e.g., a desktop computer, a laptop, a mobile device, and/or the like), a specially-designed computing device (e.g., a dedicated video encoding device), and/or the like. Additionally, although not illustrated herein, the decoding device 208 may include any combination of components described herein with reference to encoding device 202, components not shown or described, and/or combinations of these.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components, or combinations thereof, may be distributed and/or duplicated across a number of computing devices.

In embodiments, the memory 214 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to store information and can be accessed by a computing device such as, for example, quantum state memory, and the like. In embodiments, the memory 214 stores computer-executable instructions for causing the processor 212 to implement aspects of embodiments of system components discussed herein and/or to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include a segmenter 218, a foreground detector 220, an encoder 222, and a communication component 224. Some or all of the functionality contemplated herein may also, or alternatively, be implemented in hardware and/or firmware.

In embodiments, the segmenter 218 may be configured to segment a video frame into a number of segments. The segments may include, for example, objects, groups, slices, tiles, and/or the like. The segmenter 218 may employ any number of various automatic image segmentation methods known in the field. In embodiments, the segmenter 218 may use image color and corresponding gradients to subdivide an image into segments that have similar color and texture. Two examples of image segmentation techniques include the watershed algorithm and optimum cut partitioning of a pixel connectivity graph. For example, the segmenter 218 may use Canny edge detection to detect edges on a video frame for optimum cut partitioning, and create segments using the optimum cut partitioning of the resulting pixel connectivity graph.

In embodiments, the foreground detector 220 is configured to perform foreground detection on a video frame. For example, in embodiments, the foreground detector 220 may perform segment-based foreground detection, where the foreground segments, or portions of the segments, determined by the segmenter 218 are detected using one or more aspects of embodiments of the methods described herein. In embodiments, the foreground detector 220 may perform foreground detection on images that have not been segmented. In embodiments, results of foreground detection may be used by the segmenter 218 to inform a segmentation process.

As shown in FIG. 1, the encoding device 202 also includes an encoder 222 configured for entropy encoding of partitioned video frames, and a communication component 224. In embodiments, the communication component 224 is configured to communicate encoded video data 206. For example, in embodiments, the communication component 224 may facilitate communicating encoded video data 206 to the decoding device 208.

The illustrative operating environment 200 shown in FIG. 2 is not intended to suggest any limitation as to the scope of use or functionality of embodiments of the present invention. Neither should the illustrative operating environment 200 be interpreted as having any dependency or requirement related to any single component or combination of components illustrated therein. Additionally, any one or more of the components depicted in FIG. 2 may be, in embodiments, integrated with various ones of the other components depicted therein (and/or components not illustrated), all of which are considered to be within the ambit of the present invention.

Figure 3:
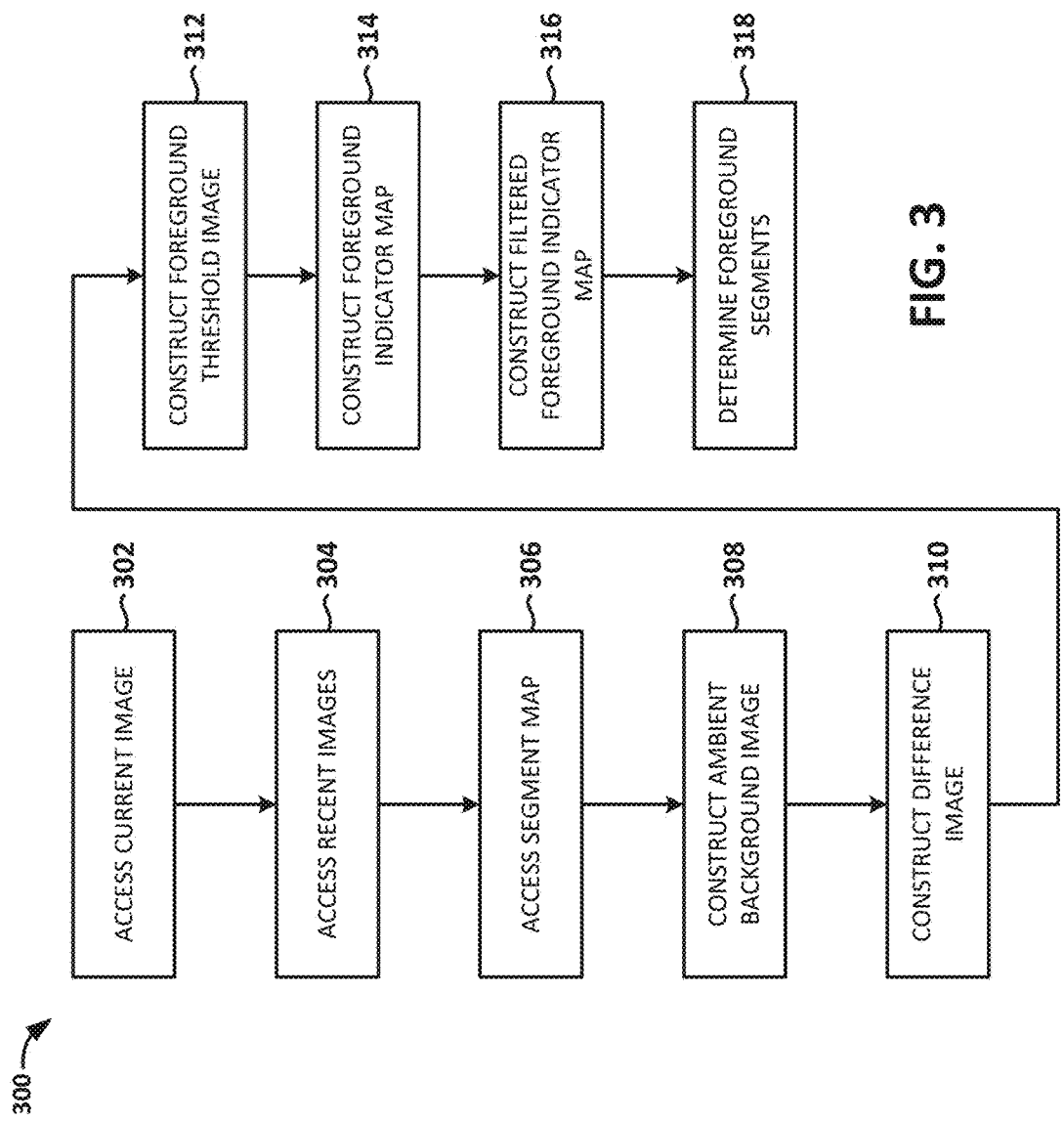
FIG. 3 is a flow diagram depicting an illustrative method of detecting foreground, in accordance with embodiments of the present invention.

FIG. 3 is a flow diagram depicting an illustrative method 300 of detecting foreground pixels in an image. In embodiments, aspects of the method 300 may be performed by an encoding device (e.g., the encoding device 102 depicted in FIG. 1 and/or the encoding device 202 depicted in FIG. 2). As shown in FIG. 3, embodiments of the illustrative method 300 may include accessing a current image (block 302) and accessing a set of previous images (block 304). In embodiments, the current image and set of previous images may include one or more video frames received by the encoding device from another device (e.g., a memory device, a server, and/or the like). In embodiments, the set of recent images may include one image, two images, three images, four images, or more than four images. In embodiments, the previous (e.g., recent) images have been properly registered to align with the "current" (most recent) image, including, for example, corrections for global illumination changes, such as for example, is described in M. E. Farmer, "A Chaos Theoretic Analysis of Motion and Illumination in Video Sequences," *Journal of Multimedia*, Vol. 2, No. 2, 2007, pp. 53-64; N. Chumchob and K. Chen, "A Robust Affine Image Registration Method," *International Journal of Numerical Analysis and Modeling*, Vol. 6, No. 2, pp 311-334, 2009; and Sorwar, G.; Murshed, M. and Dooley, L. (2003), Fast global motion estimation using iterative least-square estimation technique. In: 4th International Conference on Information, Communications and Signal Processing and Pacific-Rim Conference on Multimedia (ICICS-PCM '03), 15-18 Dec. 2003, Singapore, each of which is hereby incorporated by reference in its entirety for all purposes. In this manner, the set of images may include a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image.

For instance, if a recording camera moves or changes zoom during recording of a video sequence, embodiments include providing a way to compensate for that motion, so that the background of the sequence may be kept at least substantially properly aligned between frames to a degree of acceptable accuracy. Similarly, if there is some sort of lighting change in the video sequence—e.g., due to a change in the physical lighting of the scene and/or due to a fade effect applied to the video—images may be adjusted to compensate for such effects.

Figure 8A:
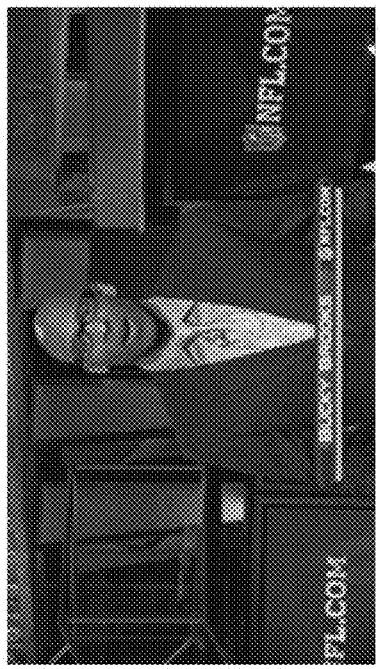
FIGS. 8A-8W depict aspects of an exemplary implementation of a method for detecting foreground in a video frame using a BFIM, in accordance with embodiments of the present invention.
Figure 8B:

For example, FIGS. 8A and 8B depict illustrative previous frames associated with a first exemplary implementation of embodiments of an algorithm for detecting foreground in a video frame ("first example"). FIG. 8A (left) depicts a Frame 000123 of nfl_bucky.avi_384×216_444.yuv. FIG. 8B (right) depicts Frame 000124 of the same sequence. These frames are a second previous frame (e.g., a "previous previous frame"), and a first previous frame (e.g., a "previous frame") for current frame 000125, which is analyzed in the following figures. The scene shows negligible camera motion and a nearly stationary man speaking to the viewer.

In a second exemplary implementation of embodiments of an algorithm for detecting foreground in a video frame ("second example"), FIG. 9A (left) depicts a Frame 002048 of AVC_720p_Stream2Encoders.y4m_320×180_444.yuv, which is a modified test video from the CableLabs research and development consortium. FIG. 9B (right) depicts Frame 002049 of the same sequence. The scene shows a woman walking through a forest with the camera tracking along with her, and several trees in the physical foreground have apparent motion due to parallax.

As shown in FIG. 3, the embodiments of the illustrative method 300 may further include accessing a segment map (block 306) that defines at least one segment of the current image such as, for example, is described in R. C. Gonzalez, R. E. Woods, "Image Segmentation", *Digital Image Processing, Second Edition*, Chapter 10, Prentice-Hall, Inc, 2002j; and M. Sonka, V. Hlavac, R. Boyle, "Segmentation I", *Image Processing, Analysis, and Machine Vision*, Chapter 6, Thomson Learning, 2008, each of which is hereby incorporated herein by reference in its entirety for all purposes. In embodiments, a segment map, in which the current frame is carved up in to distinct segments, may be accessed (e.g., generated, retrieved from storage, and/or the like), and may include each different visible object in the frame as its own segment. In embodiments, the segment map may include over-segmentation (individual objects being carved in to multiple segments). In embodiments, the segment map may include under-segmentation (multiple objects being joined as parts of the same segment). According to embodiments, foreground detection may include erring on the side of allowing false-positives.

As shown, embodiments of the illustrative method 300 may include constructing an ambient background image (block 308). The ambient background image may be used as an approximation of the unchanging background and may be constructed in any number of different ways. For example, in embodiments, the ambient background image may be a median background image that includes a set of pixels, each of the set of pixels of the median background image having a plurality of color components, where each color component of each pixel of the median background image is the median of a corresponding component of corresponding pixels in the current image, the first previous image, and the second previous image. In embodiments, the ambient background image may be constructed using other types of averages (e.g., mean and/or mode), interpolations, and/or the like.

Figure 8C:
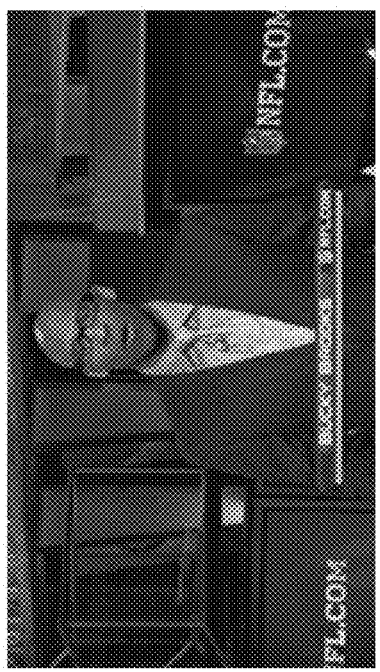
Figure 8D:
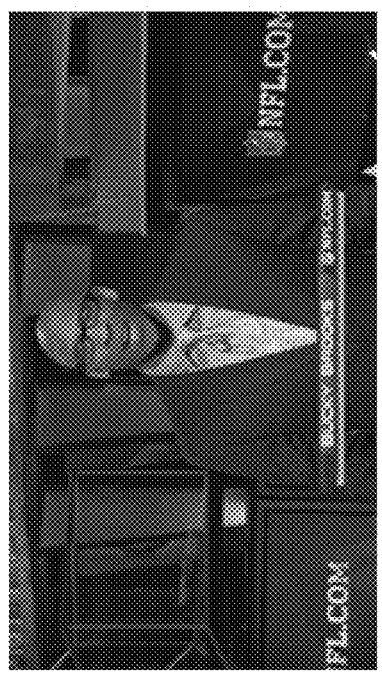

Examples of a median background image are shown in the FIGS. 8D and 9D. For example, FIG. 8C (left) depicts Frame 000125, the "current frame" for the first example analysis described herein. FIG. 8D (right) depicts the median background image associated with the first example analysis. In this case, the median image is nearly identical to frame 000124, though careful comparison shows some changes around the man's mouth. In the second example, FIG. 9C (left) depicts Frame 002050, and FIG. 9D (right) depicts the median background image.

According to embodiments of the method 300, a difference image is constructed (block 310). In embodiments, the difference image includes a set of pixels, where each pixel of the difference image indicates a difference between a corresponding pixel in the ambient background image and a corresponding pixel in the current image. Embodiments further include constructing a foreground threshold image (block 312). In embodiments, the threshold image includes a set of pixels, where each pixel of the threshold image indicates an amount by which a pixel can change between images and still be considered part of the background.

Figure 8F:
Figure 8E:

Examples of a difference image and foreground threshold image are shown in the FIGS. 8E, 8F, 9E, and 9F. In the first example, FIG. 8E (left) depicts the difference image multiplied by four. The green component shows four times the difference in Y between the current frame and the median background image, the blue component shows four times the difference in Cb, and the red component shows for times the difference in Cr. FIG. 8F (right) depicts the foreground threshold image. The green component indicates the threshold in Y, the blue component indicates the threshold in Cb, and the red component indicates the threshold in Cr.

Figure 9F:
FIGS. 9A-9W depict aspects of another exemplary implementation of a method for detecting foreground in a video frame using a BFIM, in accordance with embodiments of the present invention.
Figure 9E:

In the second example, FIG. 9E (left) depicts the difference image multiplied by four. FIG. 9F (right) depicts the foreground threshold image. The meanings of these figures are analogous to those of FIGS. 8E and 8F. It may be observed that the two trees in the physical foreground and the woman have strong outlines in the difference image, suggesting that investigation of noise reduction in the difference image may also be useful.

As shown, embodiments of the illustrative method 300 may include constructing a foreground indicator map (FIM) (block 314). The foreground indicator map includes a set of pixels, where each of the set of pixels of the foreground indicator map corresponds to one of the set of pixels in the current image, and where each of the set of pixels of the foreground indicator map includes an initial classification corresponding to a foreground or a background. The foreground indicator map may be a binary map or a non-binary map. In a binary map, each of the pixels may be classified as foreground or background, while in a non-binary map, each pixel may provide a measure of the probability associated therewith, where the probability is a probability that the pixel is foreground. In embodiments of the method 300, a binary foreground indicator map (BFIM) may be used, a non-binary foreground indicator map (NBFIM) may be used, or both may be used.

Embodiments of the illustrative method 300 further include constructing a filtered FIM by filtering noise from the FIM (block 316). In embodiments, the FIM is filtered to remove sparse noise while preserving meaningful structures—for example, it may be desirable to retain sufficiently large one-dimensional structures during the filter process because the FIM more readily shows the edges of a moving object than the body of a moving object. Motivated by the concept of the box-counting fractal dimension, embodiments may include techniques that involve looking at varying size box-regions of the FIM, and using various criteria to declare pixels in the FIM as noise. In embodiments, these criteria may be chosen such that sufficiently large one-dimensional structures with some gaps are not eliminated while sufficiently sparse noise is eliminated.

Embodiments of the illustrative method 300 may further include determining foreground segments (block 320). According to embodiments, identifying at least one segment as a foreground segment or a background segment may include determining, based on the filtered BFIM, at least one foreground metric corresponding to the at least one segment; determining, based on the at least one foreground metric, at least one variable threshold; and applying the at least one variable threshold to the filtered BFIM to identify the at least one segment as a foreground segment or a background segment. Embodiments of the foreground detection algorithm make use of an image segmentation of the current frame, and may include determining which segments are likely to be moving, erring on the side of allowing false-positives.

In embodiments, foreground may be detected by applying a static threshold for each of the three fractions for each segment, declaring any segment over any of the thresholds to be in the foreground. According to embodiments, the algorithm may use variable thresholds which simultaneously consider the foreground fractions of a plurality of (e.g., every) segments in the current frame, providing an empirically justified trade-off between the threshold and the area of the frame that is declared to be foreground. This may be justified under the assumption that the system will rarely consider input where it is both content-wise correct and computationally beneficial for the entire frame to be considered foreground, and, simultaneously, there is little overhead to allowing a few false-positives when the entire frame should be considered background.

As indicated above, embodiments of the illustrative method may include constructing a binary foreground indicator map (BFIM). In embodiments, constructing the BFIM includes determining, for each of the set of pixels in the BFIM, whether a corresponding pixel in the difference image corresponds to a difference that exceeds a threshold, where the threshold is indicated by a corresponding pixel in the threshold image, the threshold image comprising a set of pixels, where each pixel of the threshold image indicates an amount by which a pixel can change between images and still be considered part of the background; and assigning an initial classification to each of the set of pixels in the BFIM, wherein the initial classification of a pixel is foreground if the corresponding difference exceeds the threshold. That is, for example, in embodiments, each pixel of the BFIM is given a value of 1 if the corresponding pixel in the difference image shows a difference larger than the threshold indicated by the corresponding pixel in the threshold image; otherwise, the pixel is given a value of 0. Embodiments may allow for pixels to be marked as foreground in the BFIM based on any available analysis from previous frames, such as projected motion.

Figure 8G:

Examples of the BFIM are shown in FIGS. 8G and 9G. In the first example, FIG. 8G depicts the initial BFIM. It may be observed that there are some strong outlines of the man's body, but there are also many noise pixels spread throughout the image. Several regions in the initial BFIM were declared foreground based on motion information projected from a previous frame.

In embodiments, the BFIM is filtered to remove sparse noise while preserving meaningful structures—for example, it may be desirable to retain sufficiently large one-dimensional structures during the filter process because the edges of a moving object more readily show up in the BFIM than the body of the object. As discussed above, a modified box counting technique may be used to filter the BFIM. According to embodiments, using the modified box counting technique may include constructing a neighbor sum map, the neighbor sum map including, for a first pixel of the set of pixels in the BFIM, a first neighbor sum map value and a second neighbor sum map value, where the first pixel includes an initial classification as foreground. The technique may also include applying, for the first pixel, a set of filter criteria to the first and second neighbor sum map values; and retaining the initial classification corresponding to foreground for the first pixel if the filter criteria are satisfied.

Figure 4:
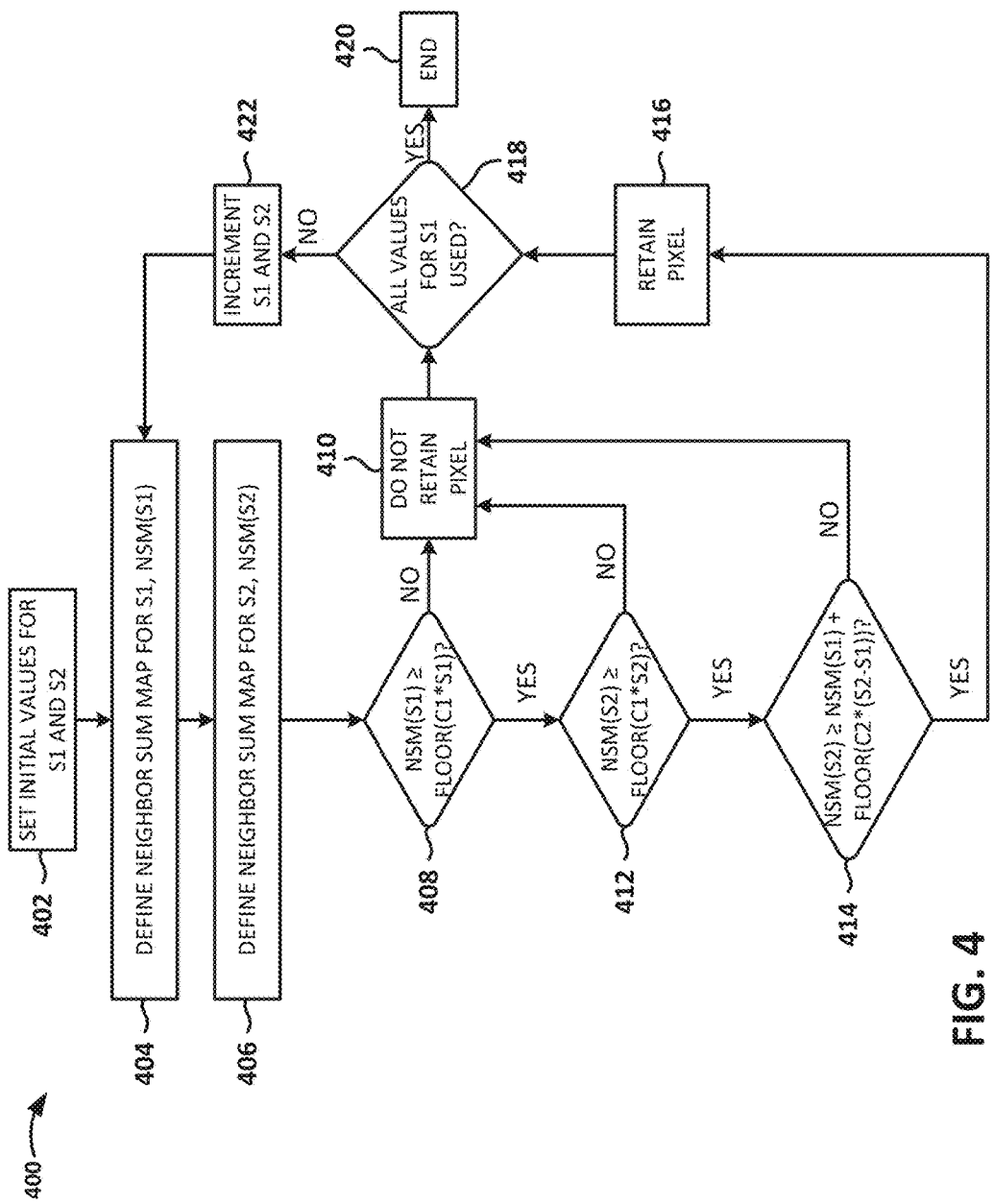
FIG. 4 is a flow diagram depicting an illustrative method of filtering a Binary Foreground Indication Map (BFIM), in accordance with embodiments of the present invention.

FIG. 4 depicts an illustrative method 400 for filtering a BFIM in accordance with embodiments of the invention. As shown, the illustrative method 400 includes setting initial values for a first box half size, s1, and a second box half size, s2 (block 402). In embodiments, s2 may be a function of s1. Embodiments of the method 400 further include defining a neighbor sum map for s1 (NSM(S1)) (block 404) and a neighbor sum map for s2 (NSM(S2)) (block 406). In embodiments, for the BFIM and a given box half size, for any given pixel p, the technique includes looking at a box of size (1+2*box half size) by (1+2*box half size) centered on that pixel, and then counting the number of indicated foreground pixels in that box; this is the value of the neighbor sum map at the pixel p. To filter the BFIM, the neighbor sum map is defined using two different box half sizes, say s1 and s2, with s1<s2. A set of criteria may then be applied to the neighbor sum map for s1 and s2 to determine whether to retain a pixel as foreground.

For example, in embodiments of the method 400 depicted in FIG. 4, for a foreground pixel to be retained, the neighbor sum maps at that pixel must pass all of the following conditions:

(1) neighborSumMap(s1)≥floor(C1*s1);
(2) neighborSumMap(s2)≥floor(C1*s2); and,
(3) neighborSumMap(s2)≥neighborSumMap(s1)+floor (C2*(s2−s1)).

In embodiments, all of the conditions may be tested. In other embodiments, as shown in FIG. 4, the conditions may be tested sequentially, for example, to avoid unnecessary computation if one of the conditions is not satisfied. As shown, the method 400 includes determining whether NSM(s1)≥floor(C1*s1) (block 408). If the inequality is not satisfied, the pixel is not retained as foreground (block 410). If the inequality is satisfied, the method 400 includes determining whether NSM(s2)≥floor(C1*s2) (block 412). If the inequality is not satisfied, the pixel is not retained as foreground (block 410). If the inequality is satisfied, the method 400 includes determining whether NSM(s2)≥NSM(s1)+floor(C1*(s2−s1)) (block 414). If this inequality is not satisfied, the pixel is not retained as foreground (block 410), whereas, if this inequality is satisfied, the pixel is retained (block 416).

As shown in FIG. 4, embodiments of the method 400 include applying the criteria repeatedly, for varying values of s1 and s2. That is, for example, embodiments of the method 400 include determining whether all of the predetermined values for s1 have been used (block 418). If so, the method 400 is concluded (block 420), whereas, if all of the values for s1 have not been used, s1 and s2 are incremented and the process is repeated (block 422). As the term is used herein, "increment" refers to assigning the next value in a set. The set of values may be predetermined, dynamically determined, and/or the like, and an increment in a value may include assigning a lower value than the previous value, a higher value than the previous value, or the same value as the previous value. In embodiments, for example, s2=s1+3 and the following values may be used for s1 in the specified order: {0, 2, 4, 6, 8, 0, 2, 4, 6}. For example, s1=0 means that we look at boxes of size 1×1 and 7×7 in the first iteration, and require there to be at least 2 pixels in the 7×7. Examples of the filtering technique are shown in FIGS. 8H through 8Q and 9H through 9Q.

According to embodiments, C1 and C2 may be selected based on empirical evidence, formulas, and/or the like, to produce desired results. In embodiments, for example, C1 may be 0.9 and C2 may be 0.4. Note that the coefficients less than unity (0.9 and 0.4) may be used to allow for some gaps in the structures that are desired to be preserved; and, in embodiments, if it is desirable to preserve only structures without gaps, those could be increased to unity. Further, if it is desirable to preserve only internal points of the structures while allowing the ends to be eliminated, those coefficients could be increased to a value of 2. Also, in embodiments, the exponents of the half sizes for the requirements (s1, s2, and (s2−s1)) are all unity; and if a different dimensionality was desired for structures to be preserved, those exponents could be modified accordingly.

As for the exact values of s1 and s2 used, it may be desirable to take s2 to be sufficiently larger than s1 to sample enough of the space for the "sufficient increase requirement" (that is, requirement "(3)") to be meaningful. Also, in embodiments, the maximum values of s1 and s2 that should be used depend on the expected sizes of the objects in the frames. The values presented here work well for video sequences that have been scaled to be a few hundred pixels by a few hundred pixels. As for the specific values of s1 chosen, the present iterative schedule has empirically been found to provide reasonably good achievement of the desired filtering; and subject to that level of quality, this schedule seems to be the minimum amount of work required.

Figure 8H:
Figure 8I:

For example, FIG. 8H depicts the change to the BFIM during the first iteration of noise reduction (s1=0). White indicates pixels which survive the iteration. Eliminated pixels are indicated in cyan. Because s1=0, there is essentially only one criteria for elimination during this iteration: eliminate if there are no other foreground pixels in a centered 7×7 box. FIG. 8I depicts the change to the BFIM during the second iteration (s1=2). Again, white indicate survival. Dark gray indicates previously eliminated pixels. Other colors indicate elimination during this iteration, and the R/G/B components tell what criteria the pixel was eliminated under: R indicates "(1) nsm(s1)<floor(0.9*s1)", G indicates "(2) nsm(s2)<floor(0.9*s2)", and B indicates "(3) nsm(s2)<nsm(s1)+floor(0.4*(s2−s1))." For example, cyan indicates failing (2) and (3) while passing (1). A pixel failing all three criteria would be light gray, but there do not seem to be any such pixels here.

Figure 8J:
Figure 8K:
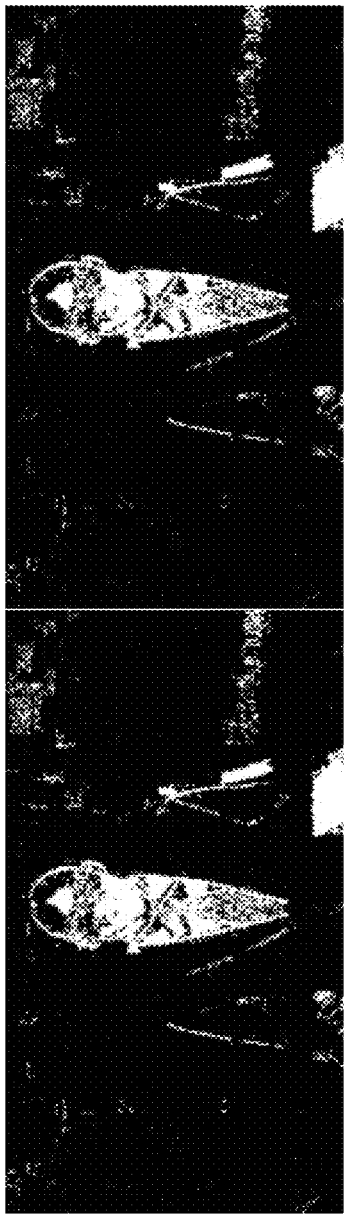
Figure 8L:
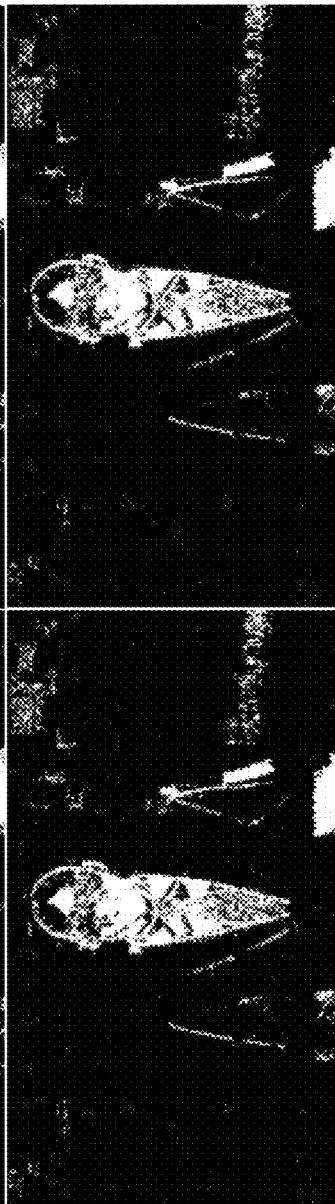
Figure 8M:
Figure 8N:
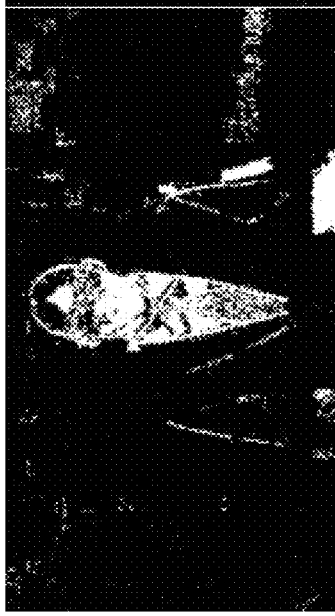
Figure 8O:
Figure 8P:

FIG. 8J depicts the change to the BFIM during the third iteration (s1=4). In this iteration, a few red, yellow, and light gray pixels are visible. FIGS. 8K-8P depict the change to the BFIM during the later iterations (s1=6, 8, 0, 2, 4, 6). In this case, the last few iterations seem to have little impact but seem to actually be slightly harmful. FIGS. 9G-9P depict the initial BFIM and the change during each iteration. These figures are analogous to FIGS. 8G through 8P. There is little change during iteration.

Figure 8Q:
Figure 9Q:

FIG. 8Q depicts a comparison of the initial and nose-reduced BFIMs. White pixels are pixels in the BFIM that survive the noise reduction process, while blue pixels were eliminated during the noise reduction process. It may be observed that most of the noise throughout the image has been eliminated, while the outlines of the man's body are mostly intact. In the second example, FIG. 9Q depicts a comparison of the initial and final BFIM. In this case, almost the entire frame is dominated by noise. While some of the pixels in the shadow regions get eliminated, the BFIM is largely unchanged by the noise reduction process. Note that several regions in the initial BFIM were declared foreground based on motion information projected from a previous frame.

Figure 5:
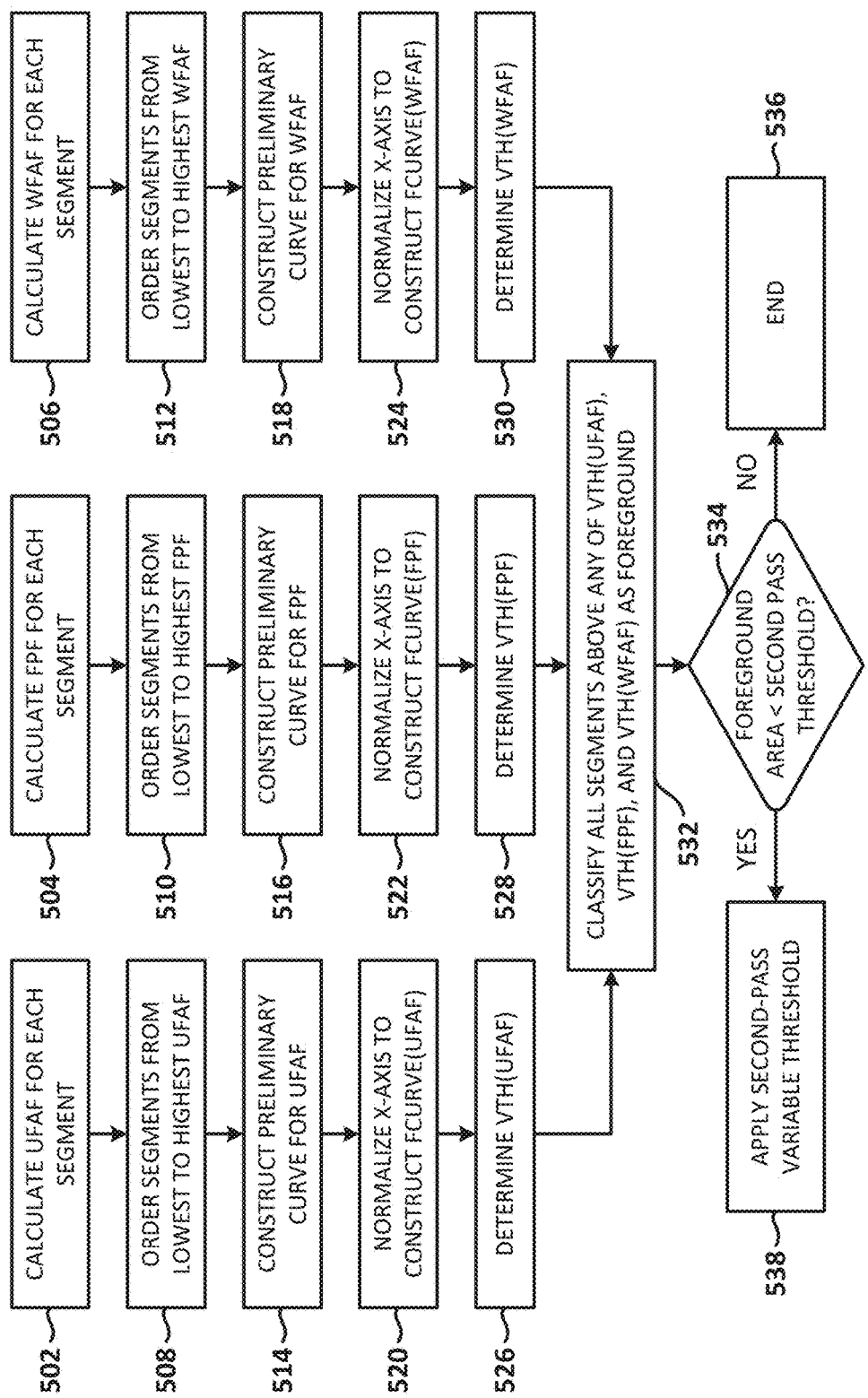
FIG. 5 is a flow diagram depicting an illustrative method for foreground detection using a BFIM, in accordance with embodiments of the present invention.

FIG. 5 depicts an illustrative method 500 for determining foreground segments using a BFIM. In embodiments, for each segment, a number of foreground metrics may be determined. For example, as shown in FIG. 5, the method 500 may include determining (1) the (unweighted) foreground area fraction (UFAF) (block 502), (2) the foreground perimeter fraction (FPF) (block 504), and (3) the weighted foreground area fraction (WFAF) (block 506). The (unweighted) foreground area fraction (UFAF) of a segment may be the number of foreground pixels in that segment divided by the total number of pixels in that segment, with foreground pixels determined by the filtered BFIM. Similarly, the foreground perimeter fraction (FBF) may be the number of foreground pixels on the perimeter of that segment divided by the total number of pixels on the perimeter of that segment. In embodiments, the unfiltered BFIM may be used for the perimeter. The weighted foreground area fraction (WFAF) may be identical to the (unweighted) foreground area fraction (UFAF), except that each pixel in the segment may be given a variable weight (e.g., pixels in regions of greater spatial variation of color may be given a higher weight, up to some capped maximum).

Figure 8R:
Figure 8T:
Figure 8S:
Figure 9R:
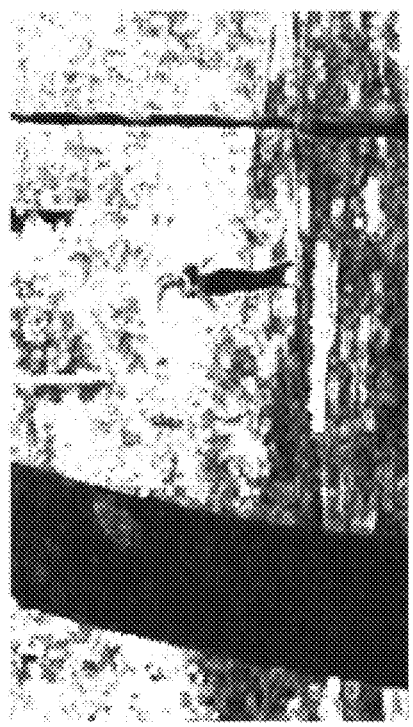
Figure 9T:
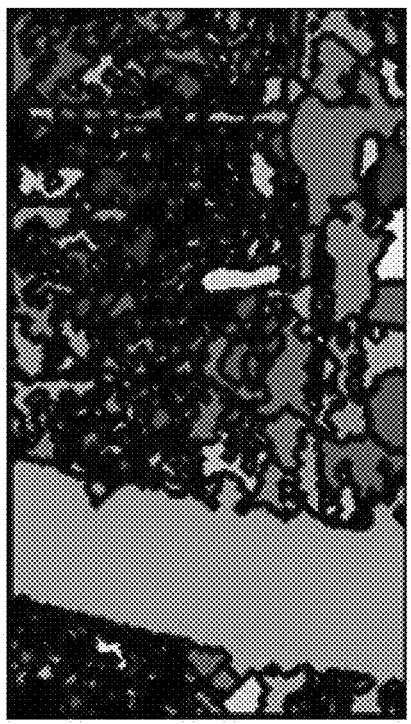
Figure 9S:
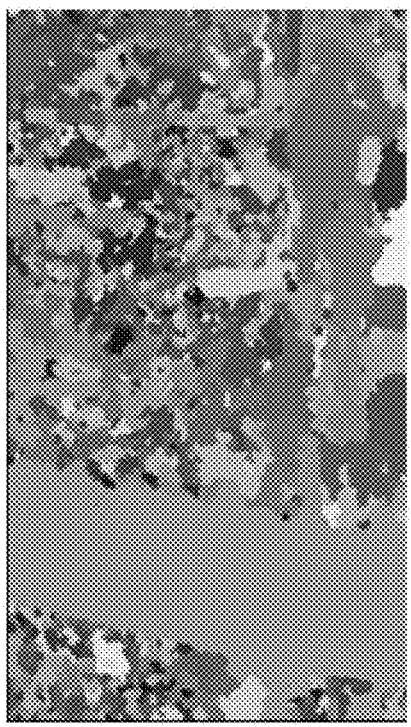

Examples of the weight map are shown in FIGS. 8R and 9R. For example, FIGS. 8R and 9R depict the weight maps used for the weighted areas. The brightness at each pixel indicates the weight of that pixel, with black being a weight of zero and white being the maximum weight. FIGS. 8S and 9S (left) depict the segment maps provided for the frames. FIGS. 8T and 9T (right) depict the doubly eroded segment maps; black pixels are not counted as part of any segment.

According to embodiments, in order to make use of a variable threshold to detect foreground using a BFIM, three foreground curves may be constructed, one for each of the foreground fractions. Each foreground curve may represent the cumulative distribution function of the area-weighted foreground fraction for that metric. As shown in FIG. 5, for each of the three metrics, the method 500 includes ordering the segments from lowest to highest foreground fraction (blocks 508, 510, and 512). The method 500 further includes constructing a preliminary curve for each of the metrics (blocks 514, 516, and 518). For example, each curve may be constructed by starting at the point (0, 0), defining the next point as (0+area of first segment, foreground fraction of first segment), the point after that as (0+area of first segment+ area of second segment, foreground fraction of second segment), and each successive point as (previous×value+ area of next segment, foreground fraction of next segment). We may normalize the x-axis by the total area of all segments (blocks 520, 522, and 524). In this way, embodiments of the method 500 may facilitate constructing monotonically increasing curves (FCURVE(UFAF), FCURVE (FPF), and FCURVE(WFAF)) that start at (0, 0) and end at (1, highest foreground fraction among segments), each segment having an impact on the curve proportional to its area.

In embodiments, the method 500 further includes determining variable thresholds for each metric (VTH(UFAF), VTH(FPF), and VTH(WFAF)) (blocks 526, 528, and 530). The variable thresholds may be determined by finding the intersection of each foreground curve with a specified monotonically decreasing threshold curve. In the case of no intersection between the curves, all of the segments may be declared to be background. The inventors have achieved positive results by taking the threshold curves to be straight lines passing through the listed points: the (unweighted) area threshold curve (VTH(UFAF)) through (0, 0.8), (1, 0.1); the perimeter threshold curve (VTH(FPF)) through (0, 1.0), (1, 0.5); and the weighted area threshold curve (VTH(WFAF)) through (0, 0.6), (1, 0.2). The method 500 may include classifying all segments which are above any of the variable thresholds as foreground (block 532), and all other segments as background.

In many cases, where good moving foreground detection seems possible under human inspection, the above criteria generally function well. However, there are some low-noise cases where small foreground motion may not be detected by the above criteria but is possible under human inspection. In order to handle these cases, a conditional second pass may be utilized. For example, a determination may be made whether the total area declared foreground is less than 25% of the total segment area (block 534). If not, the classification depicted in block 532 may be retained (block 536), but if so, then, a second-pass variable threshold may be applied (block 538).

This second-pass threshold may be applied, for example, only to the (unweighted) area fraction of doubly-eroded segments with the fraction normalized by the non-eroded area of the segment. (Examples of a doubly eroded segment map are shown in FIGS. 8T and 9T.) The threshold may be taken so that up to 25% of the total segment area is ultimately declared to be foreground, whether during the already-performed first-pass or the to-be-performed second pass, but is not allowed to be less than a lower threshold such as, for example, 0.005. In embodiments, the second pass can alternatively be thought of as the intersection of the (unweighted) doubly-eroded foreground area fraction curve with the piece-wise curve composed of the line segments (0.75, 1.0) to (0.75, 0.005) to (1, 0.005). The upper threshold of 25% of the total segment and the lower threshold of 0.005 may be adjusted and/or selected based on any number of different static and/or dynamic criteria, including, but not limited to, optimization criteria, computational burden criteria, and/or the like.

Figure 8U:
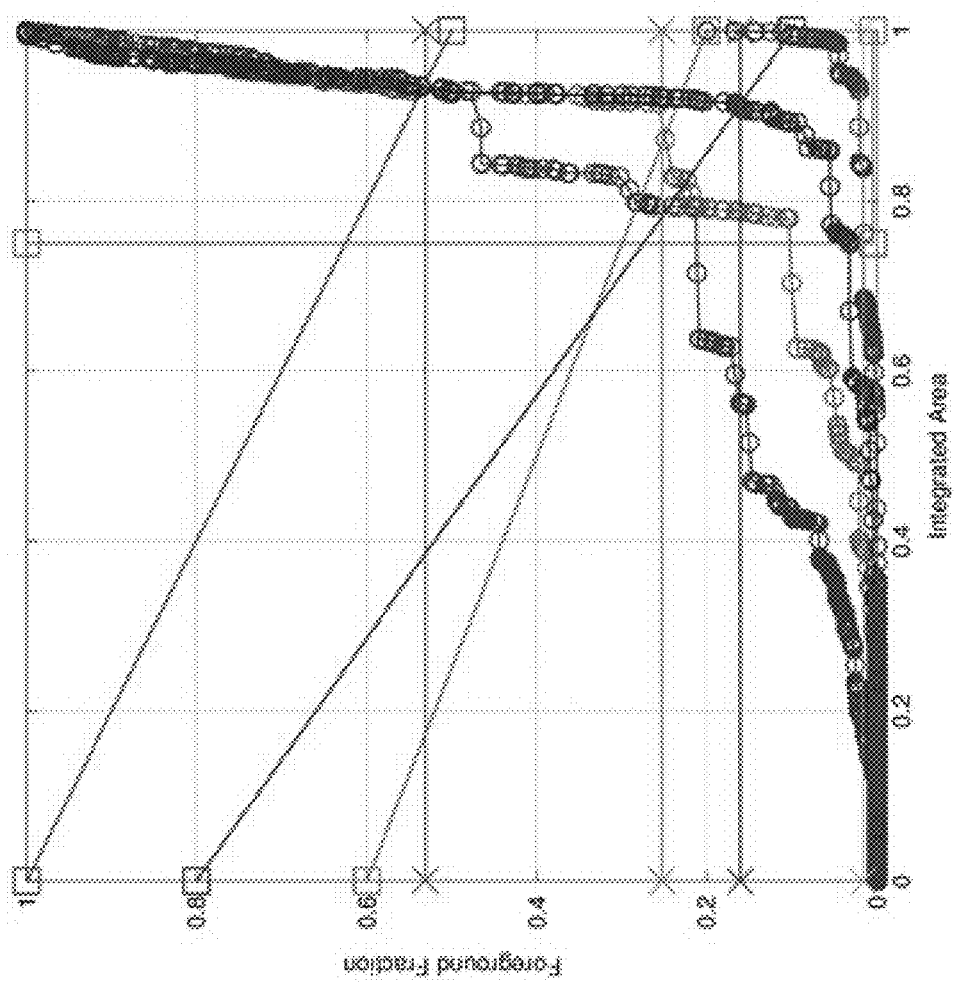
Figure 9U:
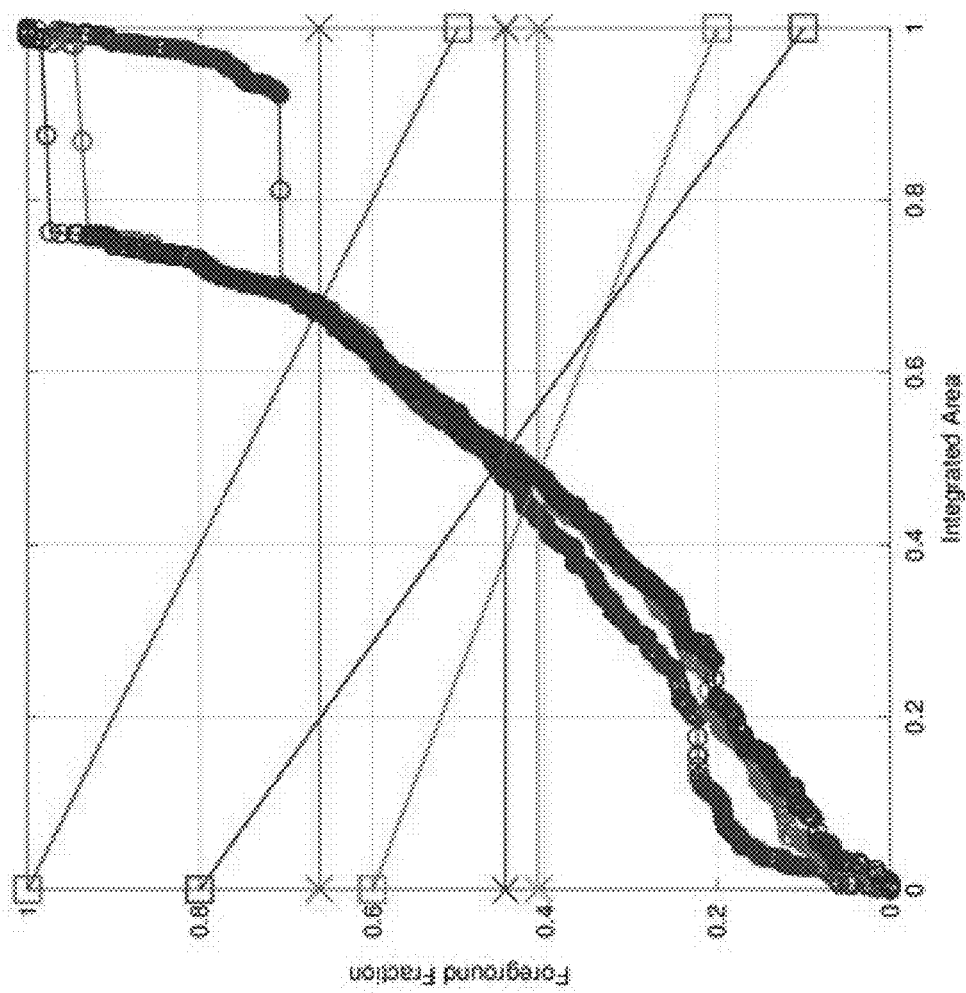

Examples of the foreground curves and determination of the thresholds for the first example are shown in FIGS. 8U and 9U. For example, FIG. 8U depicts the foreground curves, threshold curves, and calculated variable thresholds. Red indicates the first-pass perimeter criteria, green indicates the first-pass weighted area criteria, blue indicates the first-pass (unweighted) area criteria, and yellow indicates the second-pass area criteria applied to doubly eroded segments. The foreground curves are indicated with circles, the threshold curves are indicates with squares, and the obtained values of the variable thresholds are indicated with "x"s. For the second example, FIG. 9U depicts the foreground curve, threshold curves, and variable thresholds. This figure is analogous to FIG. 8U, but the second-pass has been omitted. Observe that the shape of the foreground curves are very different from the case shown in FIG. 8U.

Figure 8W:
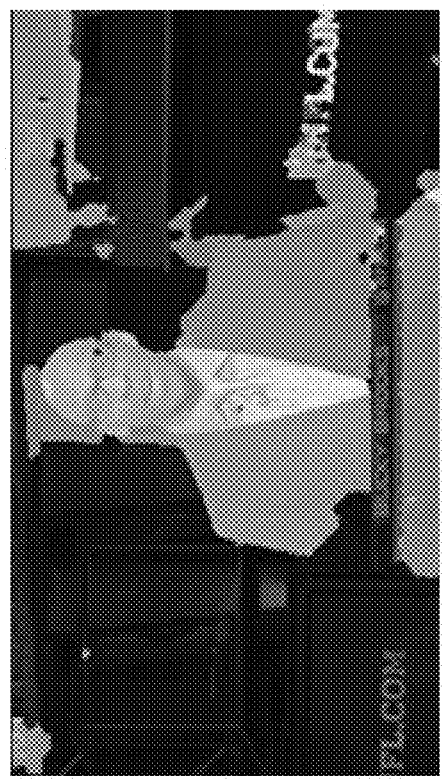

Examples of the parts of an image declared to be foreground are shown in FIGS. 8V, 8W, 9V, and 9W. In the first example, FIG. 8V (left) depicts the foreground highlight image for the first-pass. Highlight regions indicate determined foreground, with each of the R, G, and B components indicating being above the perimeter, weighted area, and (unweighted) area thresholds, respectively. FIG. 8W (right) depicts the foreground highlight image for the second-pass. Foreground regions from the first-pass are indicated in white. Foreground regions from the second-pass are indicated in yellow. Observe that the second-pass manages to pick out most of the rest of the man's body without too many false-positives.

Figure 8V:
Figure 9W:
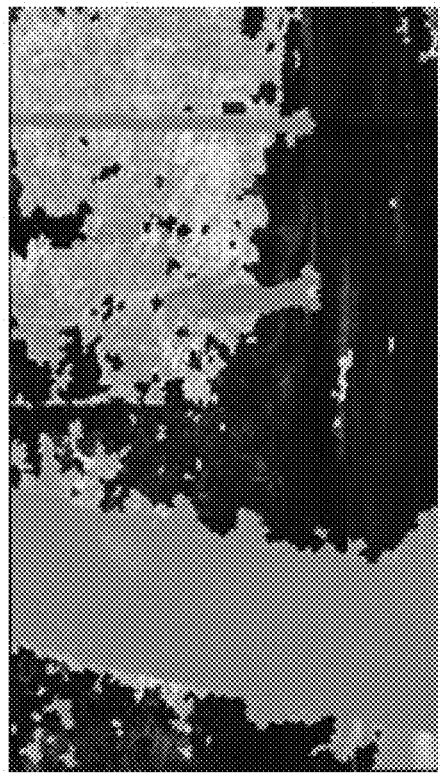
Figure 9V:
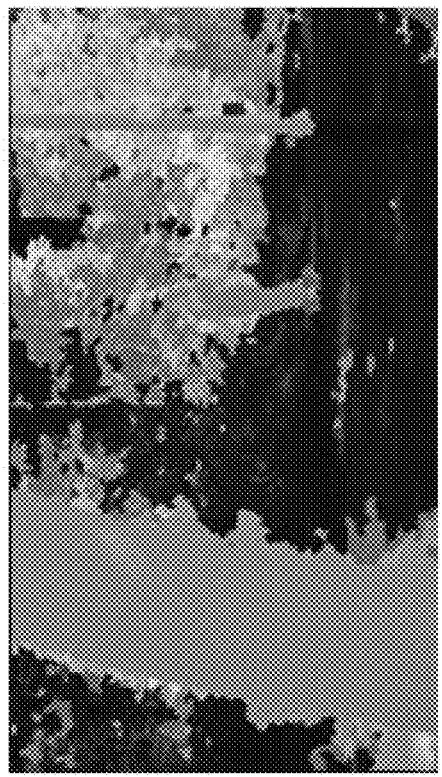

In the second example, FIG. 9V (left) depicts the foreground highlight image for the first-pass, analogous to FIG. 8V. FIG. 9W (right) depicts the foreground highlight image for the second-pass; but, since the second pass was not performed, the figure simply highlights the regions that were already determined to be foreground. It may be observed that many of the trees in the background are undesirably declared to be foreground, and further analysis may be necessary to determine that they are not moving objects.

In embodiments, double-erosion of the segments for the second-pass may be, e.g., due to providing a good balance between completely ignoring the foreground pixels in adjacent segments and their impact on noise reduction, versus fully considering them for that purpose.

As indicated above, the foreground indicator map (FIM) may be binary (BFIM) or non-binary (NBFIM) and various embodiments of methods described herein may use a BFIM, an NBFIM, or some combination of the two. As described above, the binary foreground indicator map (BFIM) may be calculated from the difference image and the foreground threshold image. Additional insight into foreground analysis may be provided by using a non-binary foreground indicator map (NBFIM). The use of a non-binary map may include a modified fractal-based analysis technique.

To construct the NBFIM, embodiments include defining the normalized absolute difference image (NADI) to be an image where each component of each pixel is equal to the corresponding value in the difference image divided by the corresponding value in the foreground threshold image. The foreground threshold image may be constructed so that it has a value of at least one for each component of each pixel. Each pixel of the unfiltered NBFIM may be defined to be equal to the arc-hyperbolic sine (a sin h) of the sum of the squares of the components of the corresponding pixel in the normalized absolute difference image (NADI) with a coefficient of 0.5 for each of the chroma components; that is, for each pixel:

unfiltered NBFIM=$a \sin h(\text{NADI}Y^2+0.5*\text{NADI}Cb^2+0.5*\text{NADI}Cr^2)$.

The a sin h( ) function is used to provide a un-bounded quasi-normalization, as a sin h(x)~x for small x and a sin h(x)~log(x) for large x.

Figure 10:
FIGS. 10-19 depict aspects of an exemplary implementation of a method for detecting foreground in a video frame using an NBFIM, in accordance with embodiments of the present invention.
Figure 11:
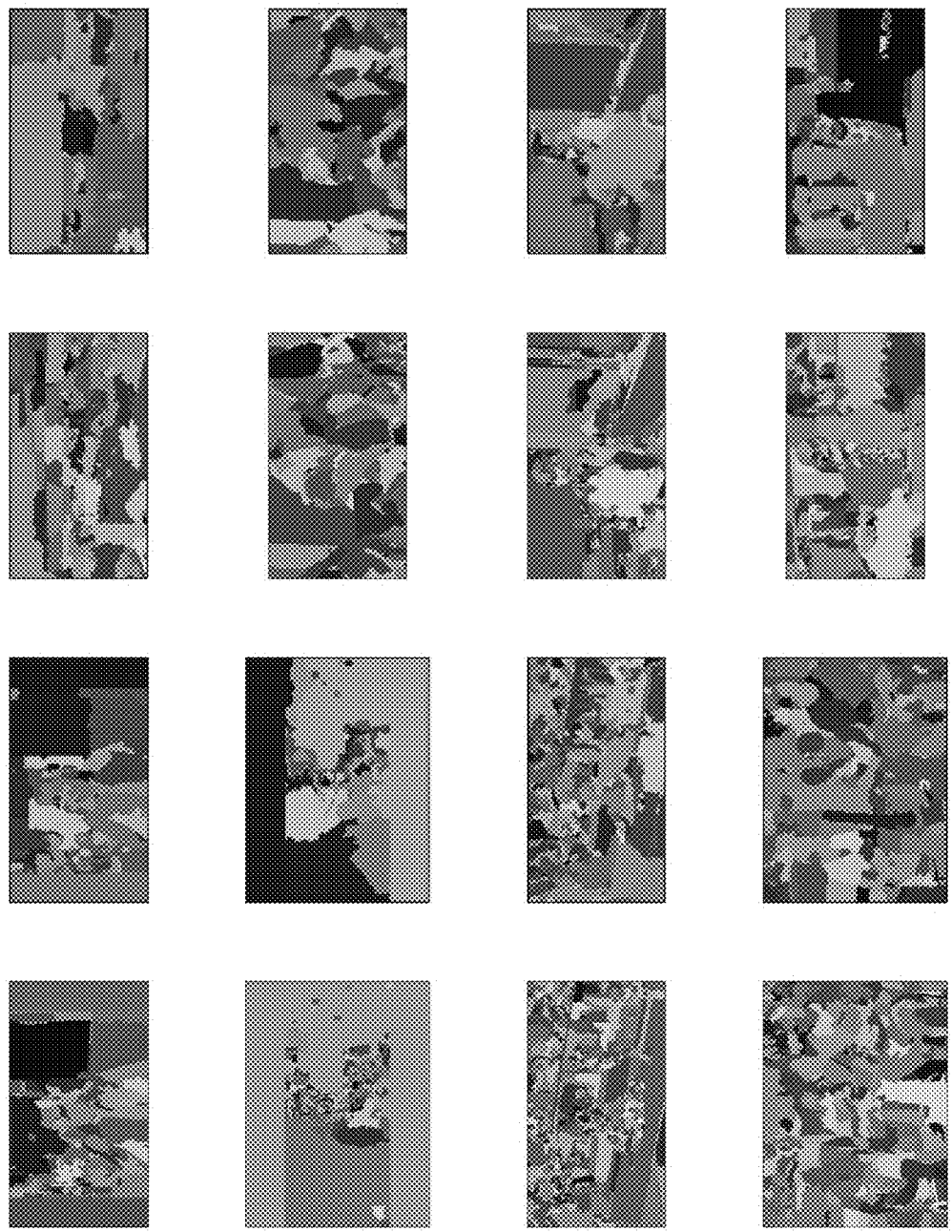
Figure 12:
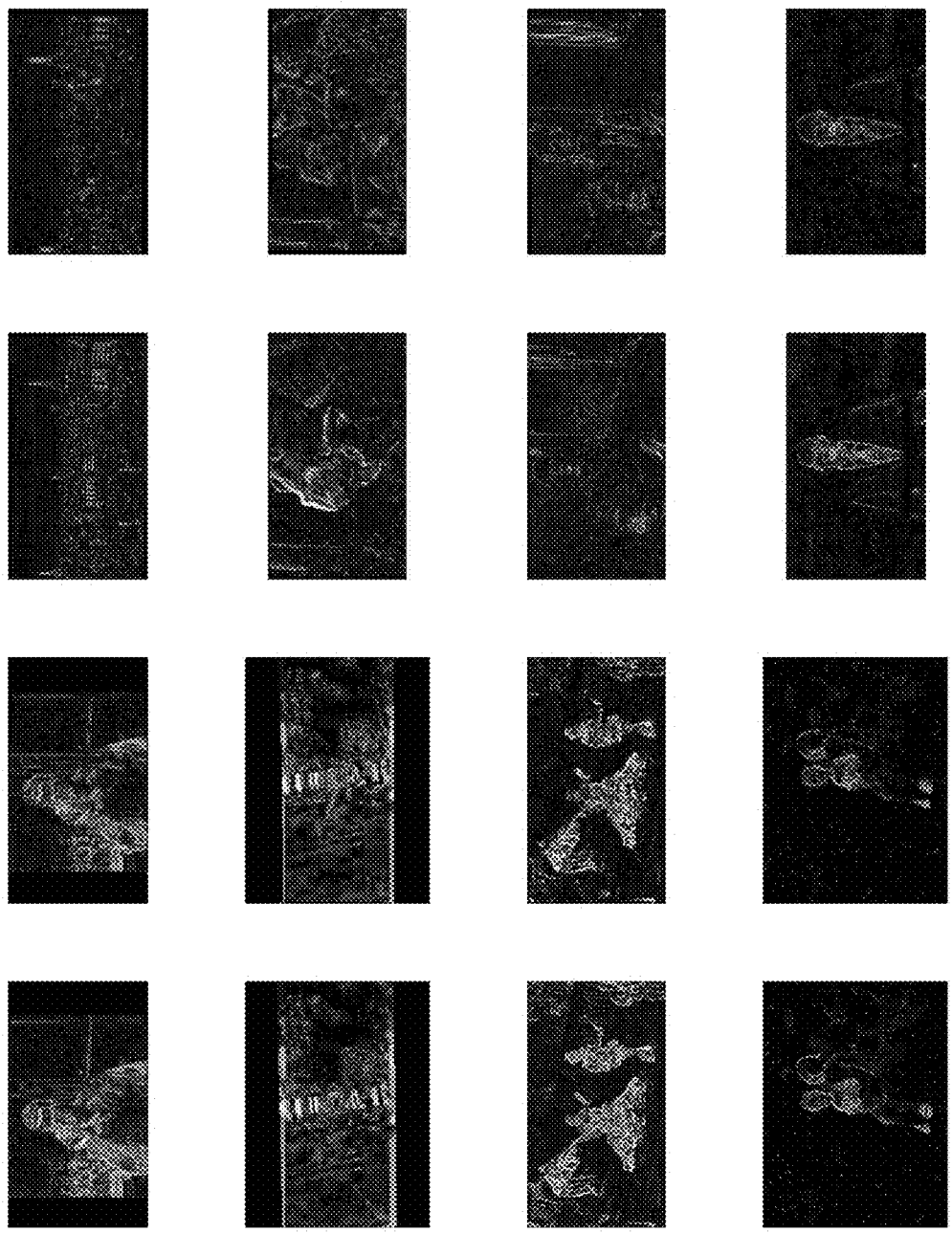

For example, FIG. 10 depicts the "current frame" for various test cases analyzed using a non-binary foreground indicator map (all sub-figures have been scaled to have the same width regardless of actual resolution). The case in column 3, row 4 is frame 000125 of nfl_bucky.avi_384× 216_444.yuv, which was examined in FIGS. 8A through 8W under the binary analysis. FIG. 11 depicts segment maps for each of the current frames depicted in FIG. 10, and sample NADI are shown in FIG. 12. The green component of each sub-figure shows 64 times the luma component of the NADI, capped to a maximum of 256. For example, a luma NADI of 1.5 would show up as a green value of 96 in this figure. Similarly, the blue and red components of the figure show 64 times the Cb and Cr component of the NADI. It may be observed that the low-resolution fish case (column 4, row 2) has the background showing up almost as strongly as the fish; this is due to improper alignment of the previous frames to the current frame. As a result, this test case serves to illustrate possible behaviors of embodiments of the methods described herein when applied to images that are not properly aligned. The alignment for the cases in columns 3 and 4 of row 3 is also flawed, though not as severely as the low-resolution fish case.

Figure 13:
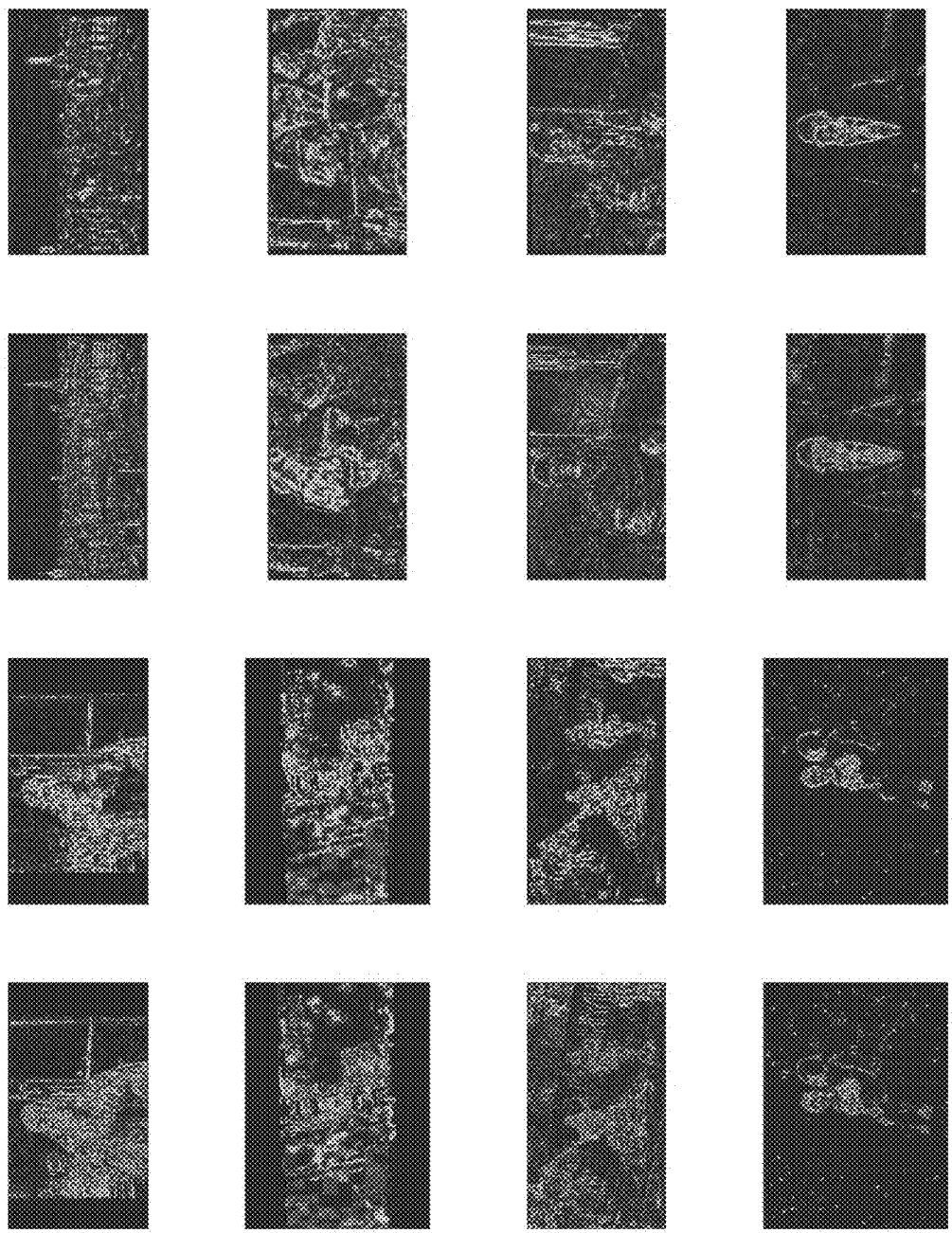

Sample unfiltered NBFIM are shown in FIG. 13. The sub-figures use the "jet" colormap, with dark blue corresponding to a value of 0.0 in the unfiltered NBFIM, green corresponding to a value of 2.0 in the unfiltered NBFIM, and dark red corresponding to a value of 4.0 or higher in the unfiltered NBFIM.

A non-binary fractal-based analysis may be used to generate the filtered NBFIM from the unfiltered NBFIM. The concept for the analysis may be the same as for the binary case, and may be based, for example, on a selected minimal linear growth rate in the neighborSumMap with respect to the box size; however, unlike the binary case, the coefficients for the growth may be based on the average value of pixels in the frame during that iteration.

Figure 6:
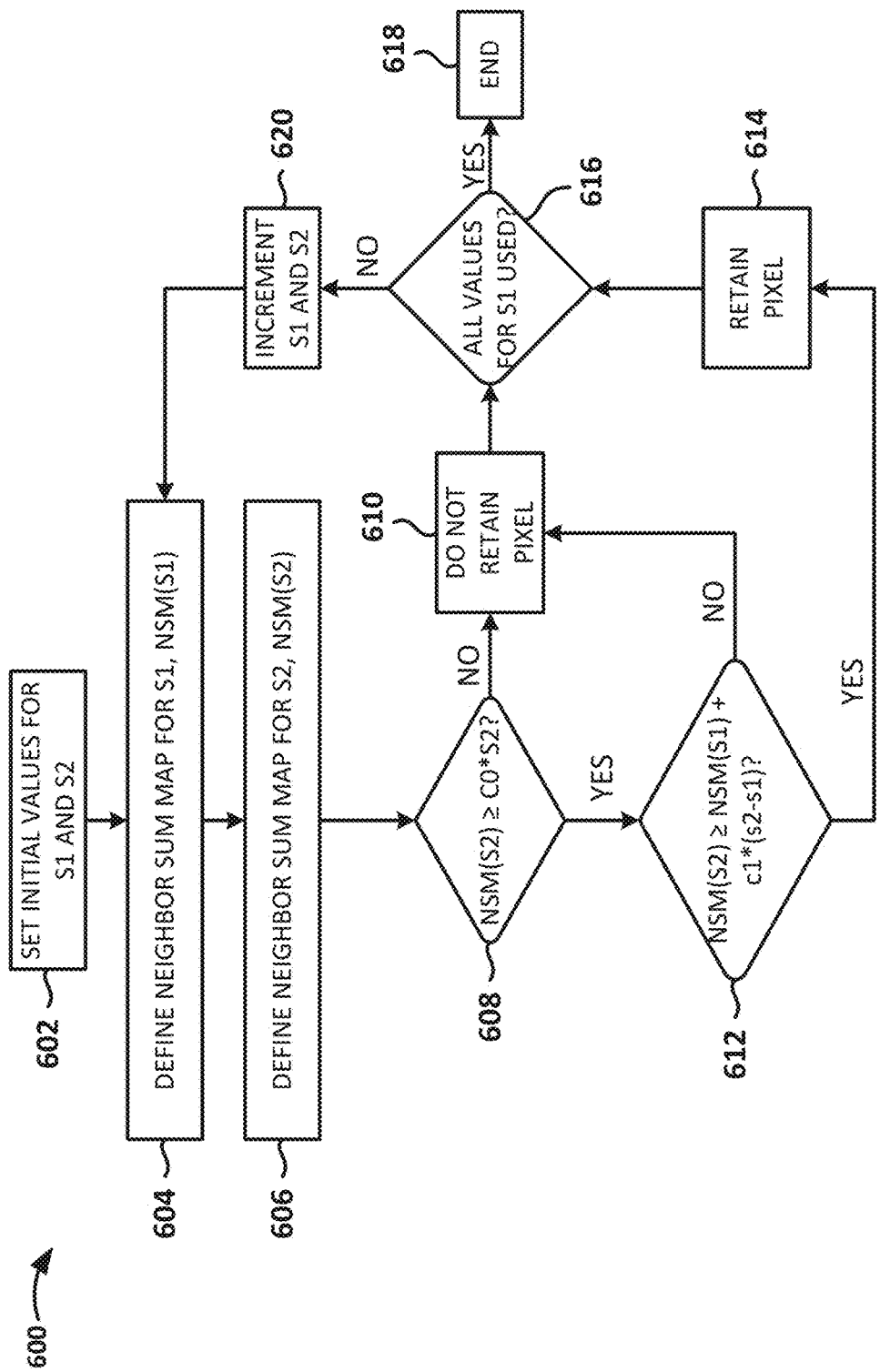
FIG. 6 is a flow diagram depicting an illustrative method of filtering a Non-Binary Foreground Indication Map (NBFIM), in accordance with embodiments of the present invention.

FIG. 6 depicts an illustrative method 600 of filtering an NBFIM in accordance with embodiments of the disclosure. As shown, the illustrative method 600 includes setting initial values for a first box half size, s1, and a second box half size, s2 (block 602). In embodiments, s2 may be a function of s1. Embodiments of the method 600 further include defining a neighbor sum map for s1 (NSM(S1)) (block 604) and a neighbor sum map for s2 (NSM(S2)) (block 606). For the NBFIM and a given box half size, for any given pixel p, the technique includes looking at a box of size (1+2*box half size) by (1+2*box half size) centered on that pixel, and then summing the pixel values of the NBFIM over that box; this is the value of the neighbor sum map at the pixel p. To filter the NBFIM, the neighbor sum map is defined using two different box half sizes, say s1 and s2, with s1<s2. A set of criteria may then be applied to the neighbor sum map for s1 and s2 to determine whether to retain a pixel as foreground. According to embodiments, any number of different criteria may be used to retain pixels.

For example, in embodiments, of the method 600 depicted in FIG. 6, for a foreground pixel to be retained, the neighbor sum maps at that pixel must pass all of the following conditions:

(1) neighborSumMap(s2)≥c0*s2; and,
(2) neighborSumMap(s2)≥neighborSumMap(s1)+(c1*(s2−s1));

where c0 is three times the average (mean) value of the NBFIM at that iteration and c1 is ten times the average (mean) value of the NBFIM at that iteration. For the first iteration, the NBFIM may simply be the unfiltered NBFIM; after that, at each iteration, the NBFIM may be the one produced by applying the rules to the previous iteration; and the filtered NBFIM may be the NBFIM after all iterations have been completed.

In embodiments, both of the conditions may be tested. In other embodiments, as shown in FIG. 6, the conditions may be tested sequentially, for example, to avoid unnecessary computation if one of the conditions is not satisfied. As shown, the method 600 includes determining whether NSM (s2)≥C0*s2 (block 608). If the inequality is not satisfied, the pixel is not retained as foreground (block 610). If the inequality is satisfied, the method 600 includes determining whether NSM(s2)≥NSM(s1)+C1*(s2−s1) (block 612). If the inequality is not satisfied, the pixel is not retained as foreground (block 610). If the inequality is satisfied, the pixel is retained (block 614).

As shown in FIG. 6, embodiments of the method 600 include applying the criteria repeatedly, for varying values of s1 and s2. That is, for example, embodiments of the method 600 include determining whether all of the values for s1 have been used (block 616). If so, the method 600 is concluded (block 618), whereas, if all of the values for s1 have not been used, s1 and s2 are incremented and the process is repeated (block 620). In embodiments, when applying to frames that are a few hundred pixels by a few hundred pixels, s1 and s2 may be defined such that s2=s1+3 and the method 600 may use, for example, the following values for s1 in the specified order: {2, 4, 6, 8, 10, 12, 2, 4, 6, 8, 10, 12}. Note that, unlike the binary case, we have not made use of a check on neighborSumMap(s1) by itself.

Figure 14:
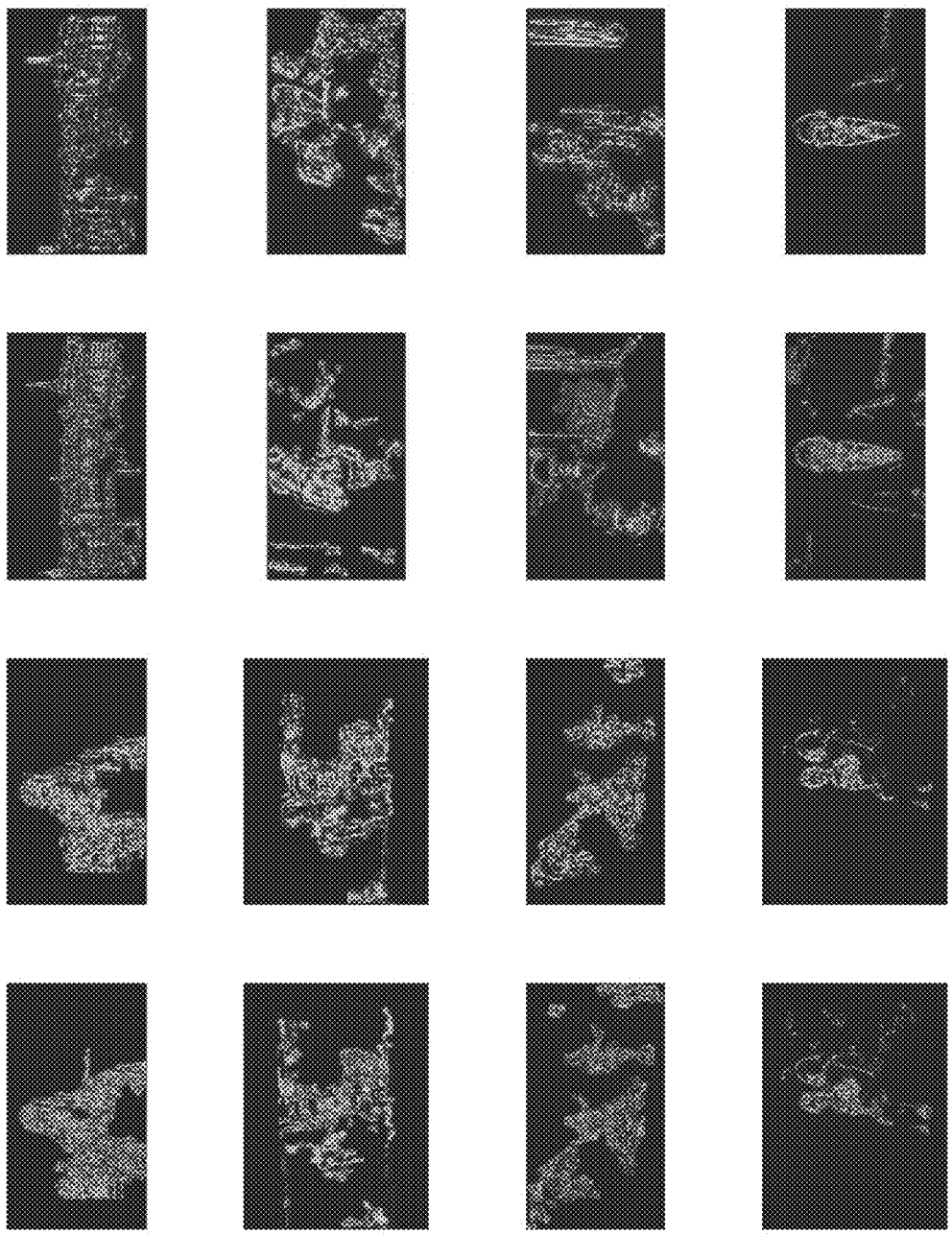

Sample filtered NBFIM are shown in FIG. 14. The color scale is the same as in FIG. 13. It may be observed that the filtering provided by embodiments of the fractal-based analysis described herein facilitates reduction of the noise and background pixels in most of the images while preserving most of the one-dimensional structures in the foreground.

Figure 7:
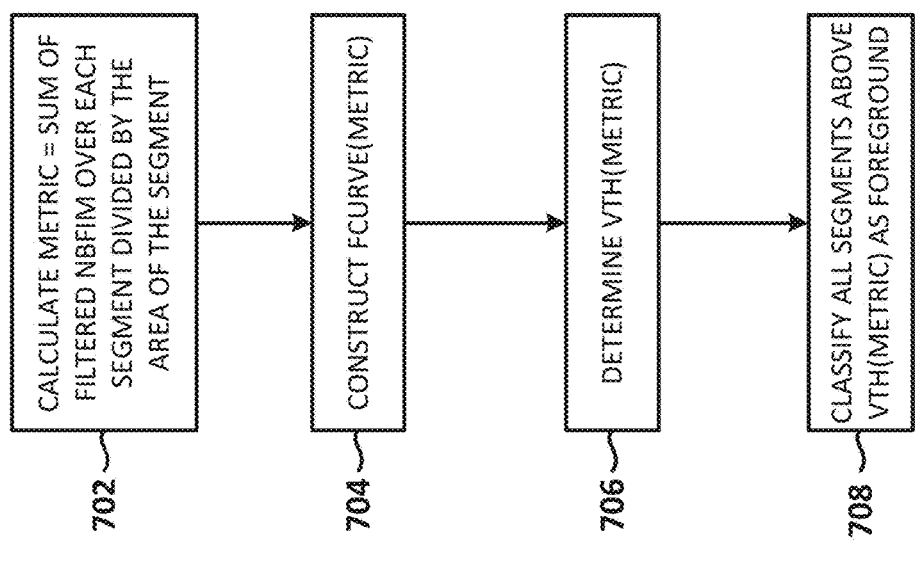
FIG. 7 is a flow diagram depicting an illustrative method for foreground detection using an NBFIM, in accordance with embodiments of the present invention.

The filtered NBFIM can be used for foreground detection in a manner analogous to the binary case. FIG. 7 depicts an illustrative method 700 for foreground detection using an NBFIM in accordance with embodiments of the disclosure. As shown, the illustrative method 700 includes calculating a foreground metric (block 702), which may, for example, be the sum of the filtered NBFIM over each segment divided by the area of the segment. The calculated foreground metric is used for constructing a foreground curve (FCURVE(METRIC)) (block 704). The method 700 includes determining a variable threshold (VTH(METRIC)), such as, for example, by determining the intersection between FCURVE(METRIC) and a threshold curve (block 706). In embodiments, the threshold curve may be, for example, the line from (0, 0.5) through (1, 0.0). As in the binary case, segments above the variable threshold may be classified as foreground (block 708).

Figure 15:
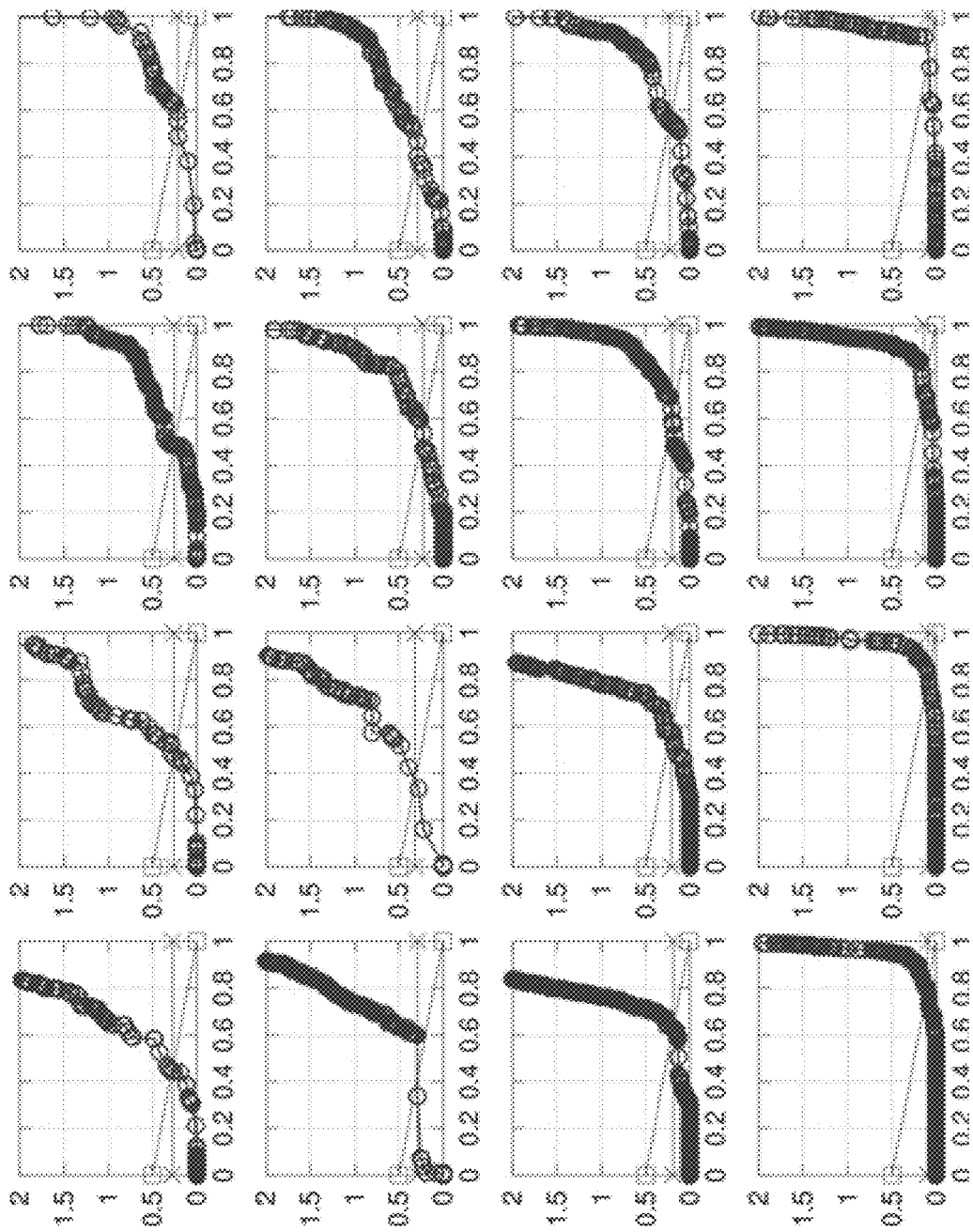
Figure 16:
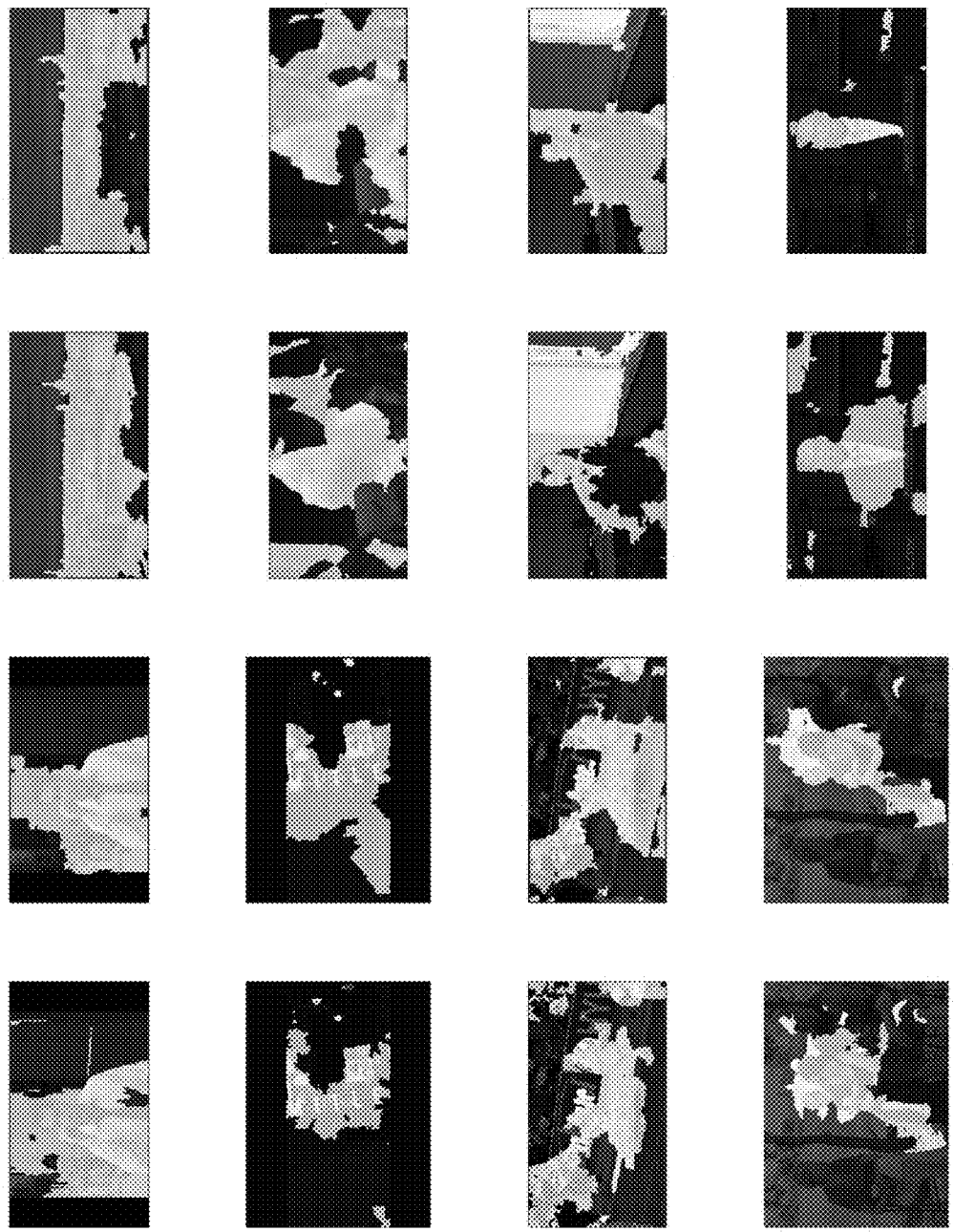

Samples of the foreground curves and determined foreground for a number of cases are illustrated in FIGS. 15 and 16, in which threshold curves are indicated by line segments. In FIG. 16, the highlighted regions indicated foreground and the darkened regions indicated background. Note that the letterbox mattes in the four cases in the upper left corner are excluded from the foreground analysis and are treated as having zero area and no foreground as part of the foreground curve. Though there is clearly some room for improvement, these figures illustrate that our non-binary foreground detection algorithm can perform reasonably well even in a number of challenging cases.

Figure 17:
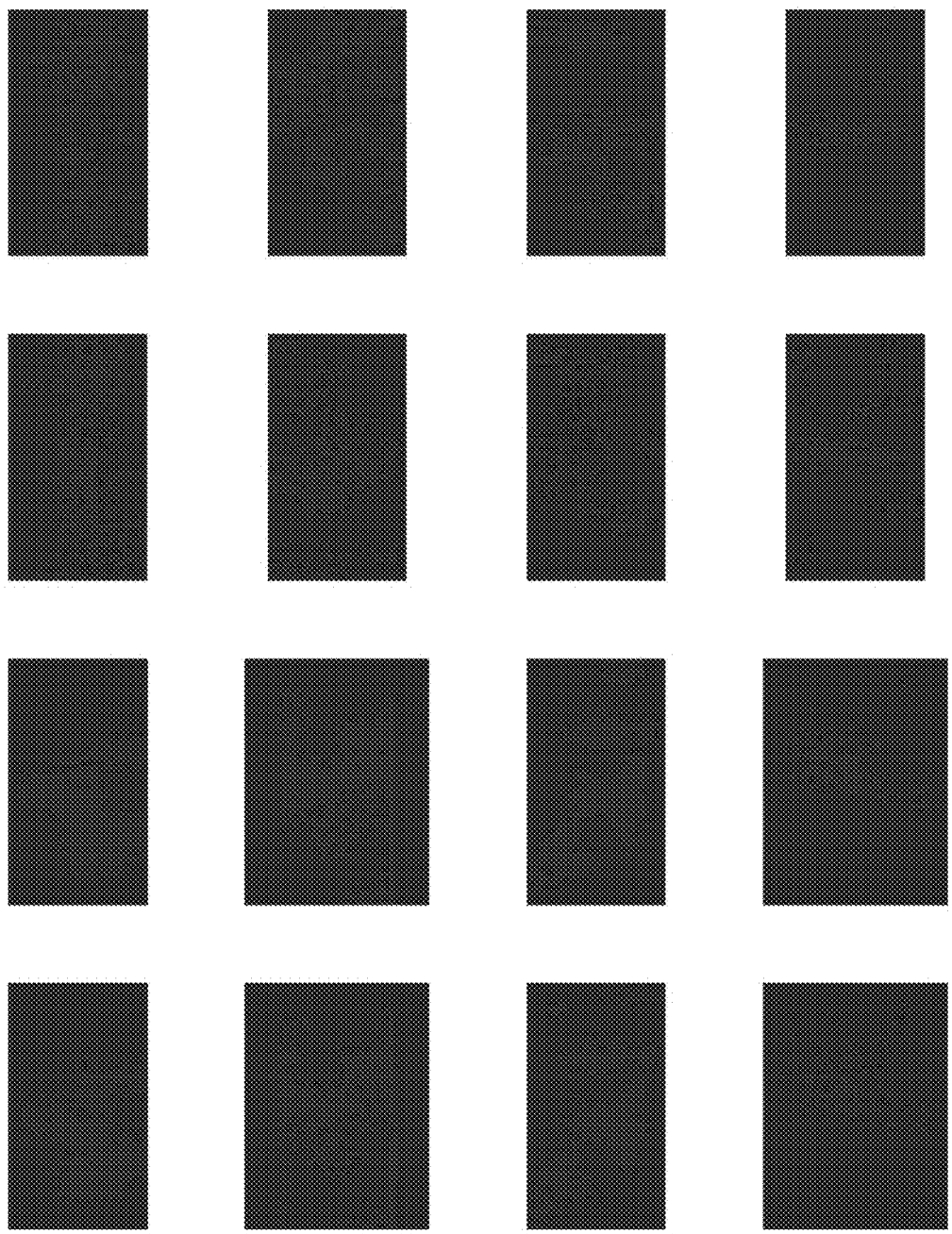
Figure 18:
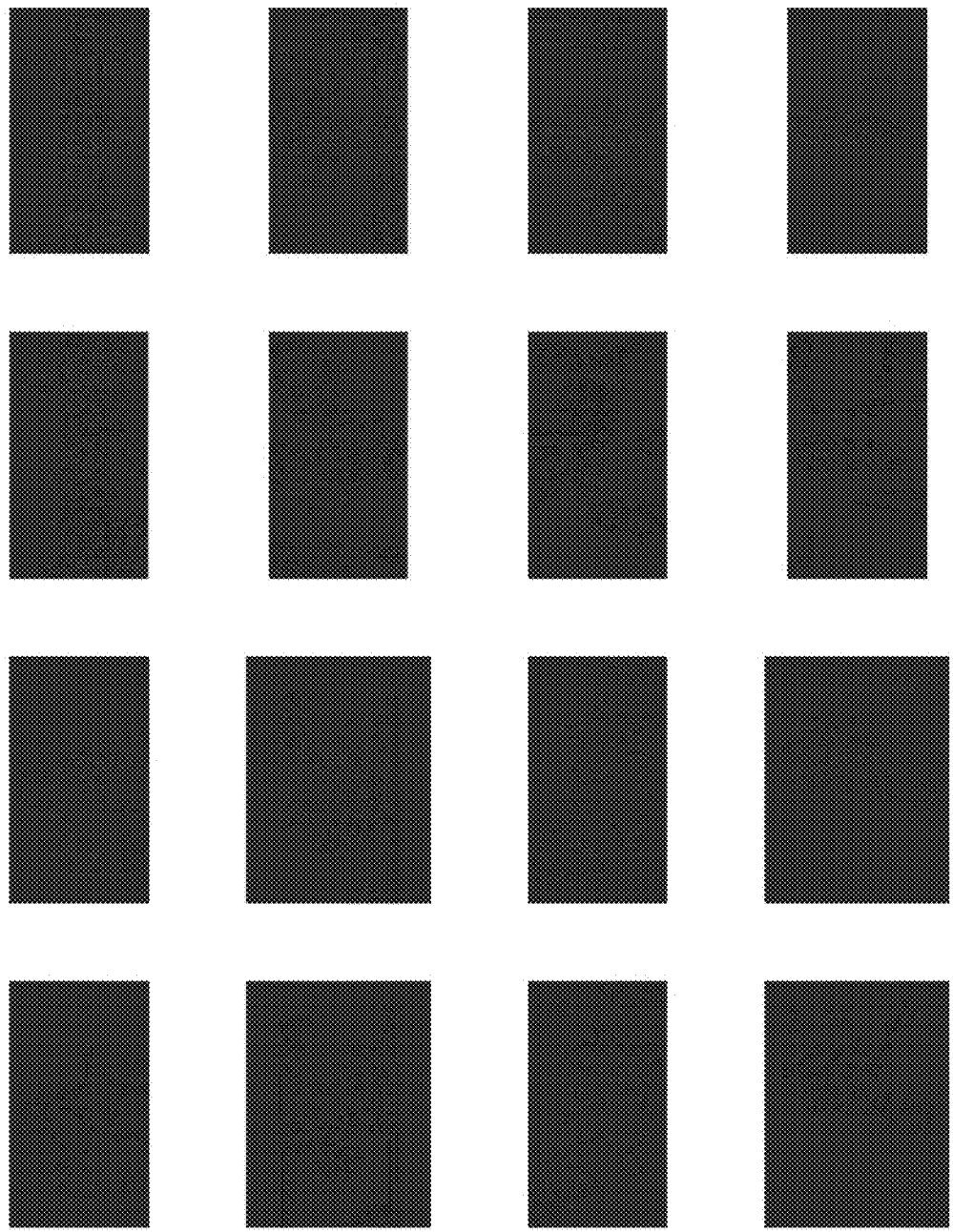
Figure 19:
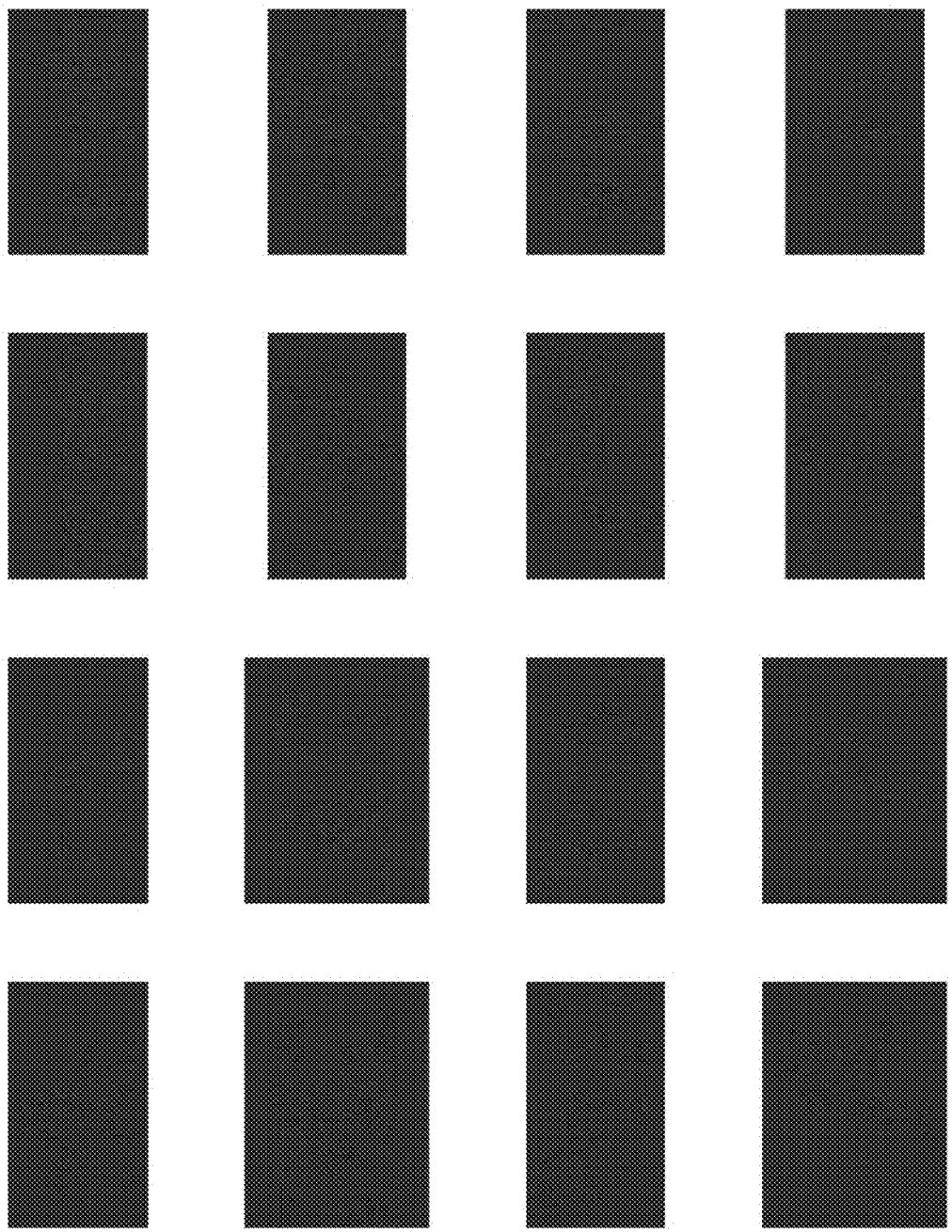

According to embodiments, a number of other possible foreground metrics may exist. For example, even in some difficult cases, embodiments of the methods described above may facilitate eliminating noise while retaining many desired one-dimensional structures. Thus, for example, a simple edge-enhancing technique can be applied to the filtered NBFIM to help identify the edges of moving objects. One such technique may include setting the preliminary mask to be the set of all points in the filtered NBFIM that have a value greater than unity, and setting the base mask=dilate3×3(preliminary mask), where dilate3×3( ) means that each pixel of the output is set to the maximum value among the corresponding pixel and its 8 neighbors (this step may be performed to reduce any gaps in the structures). The technique may further include setting the outline mask=base mask & (¬ erode3×3(base mask)), where erode3×3( ) is analogous to dilate3×3( ) but uses the minimum, "&" indicates a bit-wise "and operation", and "¬" indicates a negation. The outline mask may give the outline of the base mask, not the edges of moving objects. We then set the edge mask=imerode3×3(imdilate3×3(outline mask)). Samples of the base, outline, and edge masks are shown in FIGS. 17 through 19, respectively. It may be possible to use this additional information as part of another foreground metric to improve foreground determination.

According to various embodiments of the disclosure, the choice of the variable threshold may allow for some room for customization and/or optimization. For example, embodiments may focus on finding the "knee" of the foreground curves, which may be considered as the minima of the derivative of (the foreground curve minus x−), which serves as a discrete analogue of search for points where df/dx=1. Embodiments may incorporate some method of detecting locally varying illumination changes, such as that used by Farmer, as described in M. E. Farmer, "A Chaos Theoretic Analysis of Motion and Illumination in Video Sequences", *Journal of Multimedia*, Vol. 2, No. 2, 2007, pp. 53-64; and M. E. Farmer, "Robust Pre-Attentive Attention Direction Using Chaos Theory for Video Surveillance", *Applied Mathematics*, 4, 2013, pp. 43-55. Embodiments may include applying our fractal-analysis filter or a variable threshold to the difference image might also be worth investigating, such as FIG. 9E.

For the non-binary case, embodiments may include various modifications. For example, embodiments may make use of a multi-pass method, as we described above for the binary case. For example, the first pass may be sufficient to identify any clearly moving objects; then, if too little area were identified as foreground, a second pass may be performed to identify slight motion. In embodiments, the calculation of the threshold image may be performed in any number of different ways such as, for example, by applying one or more filters to it, and/or considering the temporal variation of pixels as part of the threshold. Another approach, according to embodiments, may include dividing the foreground sum by some linear measure of a segment size, e.g., the square root of the area.

While embodiments of the present invention are described with specificity, the description itself is not intended to limit the scope of this patent. Thus, the inventors have contemplated that the claimed invention might also be embodied in other ways, to include different steps or features, or combinations of steps or features similar to the ones described in this document, in conjunction with other technologies. For example, embodiments of the foreground detection techniques described herein may be used to detect foreground in images that have not been segmented. That is, a FIM (e.g., a BFIM and/or an NBFIM) may be constructed based on an unsegmented image. In embodiments, such a FIM may be filtered and the remaining foreground pixels may be classified as foreground.

The invention claimed is:

1. A method of foreground detection performed by a processor, the method comprising:
receiving a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image;
receiving a segment map corresponding to the current image, the segment map defining at least one segment of the current image;
constructing a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification corresponding to a foreground or a background, wherein constructing the foreground indicator map comprises:
constructing an ambient background image; and
constructing a difference image, the difference image comprising a set of pixels, wherein each pixel of the difference image indicates a difference between a corresponding pixel in the ambient background image and a corresponding pixel in the current image;
constructing a filtered foreground indicator map by filtering the foreground indicator map by applying a filter configured to preserve structures having a fractal dimensionality of at least one; and
identifying, based on the filtered foreground indicator map, the at least one segment as a foreground segment or a background segment.

2. The method of claim 1, wherein the ambient background image comprises a median background image, the median background image comprising a set of pixels, each of the set of pixels of the median background image having a plurality of color components, wherein each color component of each pixel of the median background image comprises the median of a corresponding component of corresponding pixels in the current image, the first previous image, and the second previous image.

3. The method of any of claims 1-2, wherein the foreground indicator map is a binary foreground indicator map (BFIM).

4. The method of any of claims 1-2, wherein the foreground indicator map is a non-binary foreground indicator map (NBFIM).

5. A method of foreground detection performed by a processor, the method comprising:
   receiving a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image;
   receiving a segment map corresponding to the current image, the segment map defining at least one segment of the current image;
   constructing a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification corresponding to a foreground or a background, wherein the foreground indicator map is a binary foreground indicator map (BFIM), and wherein constructing the BFIM comprises:
      determining, for each of the set of pixels in the BFIM, whether a corresponding pixel in the difference image corresponds to a difference that exceeds a threshold, wherein the threshold is indicated by a corresponding pixel in the threshold image, the threshold image comprising a set of pixels, wherein each pixel of the threshold image indicates an amount by which a pixel can change between images and still be considered part of the background; and
      assigning an initial classification to each of the set of pixels in the BFIM, wherein the initial classification of a pixel is foreground if the corresponding difference exceeds the threshold;
   constructing a filtered foreground indicator map by filtering the foreground indicator map by applying a filter configured to preserve structures having a fractal dimensionality of at least one; and
   identifying, based on the filtered foreground indicator map, the at least one segment as a foreground segment or a background segment.

6. The method of claim 5, wherein filtering the BFIM comprises:
   constructing a neighbor sum map, the neighbor sum map comprising, for a first pixel of the set of pixels in the BFIM, a first neighbor sum map value and a second neighbor sum map value, wherein the first pixel includes an initial classification as foreground;
   applying, for the first pixel, a set of filter criteria to the first and second neighbor sum map values; and
   retaining the initial classification of foreground for the first pixel if the filter criteria are satisfied.

7. The method of claim 6, wherein constructing the neighbor sum map comprises:
   identifying, for the first pixel, a first box having a first box half size, s1, centered at the first pixel;
   determining the first neighbor sum map value, the first neighbor sum map value comprising a number of pixels contained within the first box that have an initial classification as foreground;
   identifying, for the first pixel, a second box having a second box half size, s2, centered at the first pixel; and
   determining the second neighbor sum map value, the second neighbor sum map value comprising a number of pixels contained within the second box that have an initial classification as foreground.

8. The method of claim 7, wherein s1 is less than s2, and wherein retaining the initial classification of foreground for the first pixel if the filter criteria are satisfied comprises retaining the first pixel if all of the following are true:
   the first neighbor sum map value is greater than or equal to the greatest integer that is not greater than the product of s1 and a first constant;
   the second neighbor sum map value is greater than or equal to the greatest integer that is not greater than the product of s2 and the first constant; and
   the second neighbor sum map value is greater than or equal to the sum of the first neighbor sum map value and the greatest integer that is not greater than the product of a second constant and the difference between s2 and s1.

9. The method of claim 8, wherein the first constant is 0.9 and the second constant is 0.4.

10. The method of any of claims 5-9, wherein identifying the at least one segment as a foreground segment or a background segment comprises:
    determining, based on the filtered BFIM, at least one foreground metric corresponding to the at least one segment;
    determining, based on the at least one foreground metric, at least one variable threshold; and
    applying the at least one variable threshold to the filtered BFIM to identify the at least one segment as a foreground segment or a background segment.

11. The method of claim 10, wherein determining the at least one foreground metric comprises:
    determining an un-weighted foreground area fraction (UFAF) by dividing the number of foreground pixels in the at least one segment by the total number of pixels in the at least one segment;
    determining a foreground perimeter fraction (FPF) by dividing the number of foreground pixels on the perimeter of the at least one segment by the total number of pixels on the perimeter of the at least one segment; and
    determining a weighted foreground area fraction (WFAF) by applying a variable weight to each of the pixels in the at least one segment and dividing the weighted number of foreground pixels in the at least one segment by the weighted total number of pixels in the segment.

12. The method of claim 11, wherein determining, based on the at least one foreground metric, the at least one variable threshold comprises:
    constructing, based on the UFAF, a first foreground curve;
    constructing, based on the FPF, a second foreground curve;
    constructing, based on the WFAF, a third foreground curve;
    determining a first variable threshold by determining an intersection between the first foreground curve and a first monotonically decreasing threshold curve;
    determining a second variable threshold by determining an intersection between the second foreground curve and a second monotonically decreasing threshold curve; and
    determining a third variable threshold by determining an intersection between the third foreground curve and a third monotonically decreasing threshold curve;
    wherein if the at least one segment is above the first variable threshold, the second variable threshold or the third variable threshold, the at least one segment is identified as foreground.

13. A method of foreground detection performed by a processor, the method comprising:
  receiving a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image;
  receiving a segment map corresponding to the current image, the segment map defining at least one segment of the current image;
  constructing a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification corresponding to a foreground or a background, wherein the foreground indicator map is a non-binary foreground indicator map (NBFIM), and wherein constructing the NBFIM comprises:
    constructing a normalized absolute difference image (NADI), wherein the NADI comprises a set of pixels, each of the set of pixels comprising a plurality of components, wherein each component of each pixel of the NADI is equal to a corresponding value in the difference image divided by a corresponding value in the foreground threshold image;
    constructing an unfiltered NBFIM, having a set of pixels, wherein each pixel of the NBFIM is equal to the arc-hyperbolic sine of the sum of the squares of the components of a corresponding pixel in the NADI with a coefficient of 0.5 for each of the chroma components; and
    applying a non-binary fractal-based analysis to generate a filtered NBFIM;
  constructing a filtered foreground indicator map by filtering the foreground indicator map by applying a filter configured to preserve structures having a fractal dimensionality of at least one; and
  identifying, based on the filtered foreground indicator map, the at least one segment as a foreground segment or a background segment.

14. The method of claim 13, wherein filtering the NBFIM comprises:
  constructing a neighbor sum map, the neighbor sum map comprising, for each of the pixels of the NBFIM, a first neighbor sum map value and a second neighbor sum map value; and
  applying, for each of the pixels of the NBFIM, a set of filter criteria to the first and second neighbor sum map values.

15. The method of claim 14, wherein constructing the neighbor sum map comprises:
  identifying, for each of the pixels of the NBFIM, a first box having a first box half size, $s1$, centered at the pixel;
  determining the first neighbor sum map value, the first neighbor sum map value comprising a sum of the values of the NBFIM pixels contained within the first box;
  identifying, for each of the pixels of the NBFIM, a second box having a second box half size, $s2$, centered at the pixel; and
  determining the second neighbor sum map value, the second neighbor sum map value comprising a sum of the values of the NBFIM pixels contained within the second box.

16. The method of claim 15, wherein $s1$ is less than $s2$, and wherein retaining each of the pixels of the NBFIM for which the filter criteria are satisfied comprises retaining each of the pixels of the NBFIM for which all of the following are true:
  the second neighbor sum map value corresponding to the pixel is greater than or equal to the product of a variable coefficient and $s2$; and
  the second neighbor sum map value corresponding to the pixel is greater than or equal to the sum of the first neighbor sum map value and the product of a second variable coefficient and the difference between $s2$ and $s1$.

17. The method of claim 16, wherein the first variable coefficient comprises three times the mean value of the NBFIM at that iteration, and wherein the second variable coefficient comprises ten times the mean value of the NBFIM at that iteration.

18. The method of claim 17, wherein identifying the at least one segment as a foreground segment or a background segment comprises:
  determining, based on the filtered NBFIM, at least one foreground metric corresponding to the at least one segment;
  determining, based on the at least one foreground metric, at least one variable threshold; and
  applying the at least one variable threshold to the filtered NBFIM to identify the at least one segment as a foreground segment or a background segment.

19. The method of claim 18, wherein determining the at least one foreground metric comprises calculating the sum of the filtered NBFIM over each segment divided by the area of the segment.

20. The method of any of claims 13-19, further comprising applying an edge-enhancing technique to the filtered NBFIM to facilitate identification of at least one edge of a moving object.

21. One or more computer-readable media having computer-executable instructions embodied thereon for foreground detection in a digital image, the instructions configured to cause a processor, upon execution, to instantiate at least one component, the at least one component comprising:
  a foreground detector, the foreground detector configured to:
    receive a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image;
    receive a segment map corresponding to the current image, the segment map defining at least one segment of the current image;
    construct a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification as foreground or background, wherein the foreground indicator map is a non-binary foreground indicator map (NBFIM);
construct a filtered foreground indicator map by filtering the foreground indicator map by applying a filter configured to preserve structures having a fractal dimensionality of at least one; and
identify, based on the filtered foreground indicator map, the at least one segment as a foreground segment or a background segment.

22. A system for performing foreground detection, the system comprising:
an encoding device having a processor configured to instantiate at least one component stored in a memory, the at least one component comprising a foreground detector configured to:
receive a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image;
receive a segment map corresponding to the current image, the segment map defining at least one segment of the current image;
construct a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification as foreground or background, wherein the foreground indicator map is a non-binary foreground indicator map (NBFIM);
construct a filtered foreground indicator map by filtering the foreground indicator map by applying a filter configured to preserve structures having a fractal dimensionality of at least one; and
identify, based on the filtered foreground indicator map, the at least one segment as a foreground segment or a background segment.

23. A method of foreground detection performed by a processor, the method comprising:
receiving a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image;
constructing a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification corresponding to a foreground or a background, wherein the foreground indicator map is a non-binary foreground indicator map (NBFIM);
constructing a filtered foreground indicator map by filtering the foreground indicator map by applying a filter configured to preserve structures having a fractal dimensionality of at least one; and
identifying, based on the filtered foreground indicator map, each of the set of pixels as a foreground pixel or a background pixel.

24. One or more computer-readable media having computer-executable instructions embodied thereon for foreground detection in a digital image, the instructions configured to cause a processor, upon execution, to instantiate at least one component, the at least one component comprising:
a foreground detector, the foreground detector configured to:
receive a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image;
construct a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification as foreground or background, wherein the foreground indicator map is a non-binary foreground indicator map (NBFIM);
construct a filtered foreground indicator map by filtering the foreground indicator map by applying a filter configured to preserve structures having a fractal dimensionality of at least one; and
identify, based on the filtered foreground indicator map, each of the set of pixels as a foreground pixel or a background pixel.

25. A system for performing foreground detection, the system comprising:
an encoding device having a processor configured to instantiate at least one component stored in a memory, the at least one component comprising a foreground detector configured to:
receive a set of digital images, the set of digital images including a current image having a set of pixels, a first previous image having a set of pixels, at least one of which corresponds to at least one of the set of pixels of the current image, and a second previous image having a set of pixels, at least one of which corresponds to at least one pixel in each of the current image and the first previous image;
construct a foreground indicator map, the foreground indicator map comprising a set of pixels, wherein each of the set of pixels of the foreground indicator map corresponds to one of the set of pixels in the current image, and wherein each of the set of pixels of the foreground indicator map includes an initial classification as foreground or background, wherein the foreground indicator map is a non-binary foreground indicator map (NBFIM);
construct a filtered foreground indicator map by filtering the foreground indicator map by applying a filter configured to preserve structures having a fractal dimensionality of at least one; and
identify, based on the filtered foreground indicator map, each of the set of pixels as a foreground pixel or a background pixel.

* * * * *